US012676782B2

(12) United States Patent
Yang et al.

(10) Patent No.: US 12,676,782 B2
(45) Date of Patent: Jul. 7, 2026

(54) STREAMING AND NORMALIZATION FOR ASYMMETRIC NUMERAL SYSTEM-BASED PROBABILISTIC SHAPING

(71) Applicant: QUALCOMM Incorporated, San Diego, CA (US)

(72) Inventors: Wei Yang, San Diego, CA (US); Jing Jiang, San Diego, CA (US)

( * ) Notice: Subject to any disclaimer, the term of this patent is extended or adjusted under 35 U.S.C. 154(b) by 80 days.

(21) Appl. No.: 18/921,177

(22) Filed: Oct. 21, 2024

(65) Prior Publication Data

US 2026/0113234 A1 Apr. 23, 2026

(51) Int. Cl.
H04L 27/36 (2006.01)
H04L 27/34 (2006.01)

(52) U.S. Cl.
CPC ........ H04L 27/365 (2013.01); H04L 27/3488 (2013.01)

(58) Field of Classification Search
CPC ............. H04L 63/0236; H04L 63/0263; H04L 63/1425; H04L 67/06; H04L 67/1097; H04L 67/5651; H04L 1/0042; H04L 1/0061; H04L 7/0079; G06F 16/285; G06F 16/2282; G06F 21/602; G06F 21/6218; G06F 21/6245; G06F 3/048; G06F 7/00; G06F 16/22; H04B 10/541; H04B 10/5161; H04B 10/0779; H04B 10/60; H04B 10/25; H04B 10/2575; H04B 10/40; H04B 10/50
See application file for complete search history.

(56) References Cited

U.S. PATENT DOCUMENTS

| | | | | |
|---|---|---|---|---|
| 12,542,623 | B2 * | 2/2026 | Yang ...................... | H04L 1/0042 |
| 2019/0020530 | A1 * | 1/2019 | Au ........................ | H04W 72/21 |
| 2024/0097703 | A1 * | 3/2024 | Lam .................... | H03M 7/4093 |
| 2024/0275645 | A1 | 8/2024 | Yang et al. | |
| 2025/0260494 | A1 * | 8/2025 | Torbatian .............. | H04L 1/0045 |
| 2025/0350727 | A1 * | 11/2025 | Qin ...................... | H04N 19/126 |
| 2025/0356177 | A1 * | 11/2025 | Cao ...................... | G06N 3/0495 |
| 2026/0005909 | A1 * | 1/2026 | Yang ...................... | H04L 27/183 |

OTHER PUBLICATIONS

International Search Report and Written Opinion—PCT/US2025/050121—ISA/EPO—Jan. 30, 2026.
Nakamura M., et al., "Net-bit rate of 562-Gb/s with 32-GBaud Probabilistically Constellation-Shaped 1024QAM Signal Based on Entropy and Code-Rate Optimization", 2022 European Conference on Optical Communication (ECOC), Optica, Sep. 18, 2022, 4 Pages, XP034252024.

* cited by examiner

*Primary Examiner* — Eva Y Puente

(57) ABSTRACT
Methods, systems, and devices for wireless communications are described. In some examples, a first device may generate and transmit multiple shaped symbols based on a state for each shaped symbol. To generate each shaped symbol, the first device may normalize the state for each symbol in accordance with a range interval. If the state is outside the range interval, the first device may receive and convert bits from a bit buffer to generate the shaped symbol and normalize the state to be within the range interval. A second device may receive the multiple shaped symbols and generate information bits for each shaped symbol. Once the second device has received all of the shaped symbols of the sequence of shaped symbols, the second device may obtain a deshaped information vector based on the information bits generated for each shaped symbol and a state for a last shaped symbol.

30 Claims, 16 Drawing Sheets

710

720

715

705

700

1110

1120

1115

1105

1100

130

105

115

Network
Entity

Transceiver

1410

Antenna

1415

Communications
Manager

1420

Memory

Code

1430

1425

1440

Processor

1435

1405

1400

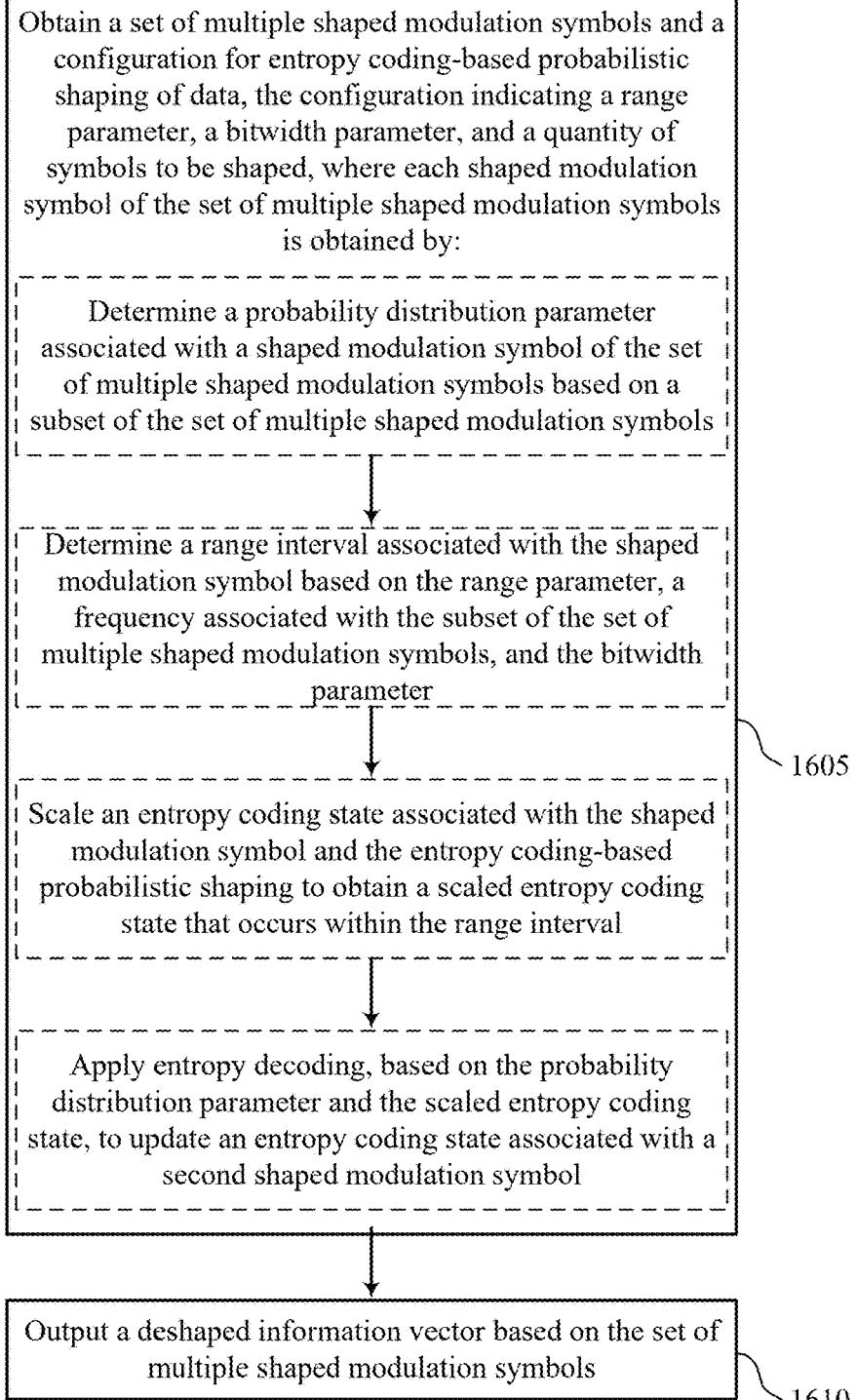

Obtain a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by:

Determine a probability distribution parameter associated with a shaped modulation symbol of the set of multiple shaped modulation symbols based on a subset of the set of multiple shaped modulation symbols Determine a range interval associated with the shaped modulation symbol based on the range parameter, a frequency associated with the subset of the set of multiple shaped modulation symbols, and the bitwidth parameter

1605

Scale an entropy coding state associated with the shaped modulation symbol and the entropy coding-based probabilistic shaping to obtain a scaled entropy coding state that occurs within the range interval Apply entropy decoding, based on the probability distribution parameter and the scaled entropy coding state, to update an entropy coding state associated with a second shaped modulation symbol Output a deshaped information vector based on the set of multiple shaped modulation symbols

STREAMING AND NORMALIZATION FOR ASYMMETRIC NUMERAL SYSTEM-BASED PROBABILISTIC SHAPING

FIELD OF TECHNOLOGY

The following relates to wireless communications, including streaming and normalization for asymmetric numeral system-based probabilistic shaping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a first wireless device is described. The method may include generating a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols, and transmitting the set of multiple shaped modulation symbols.

A first wireless device for wireless communications is described. The first wireless device may include one or more memories storing processor executable code, and one or more processors coupled with the one or more memories.

The one or more processors may individually or collectively be operable to execute the code to cause the first wireless device to generate a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols, and transmit the set of multiple shaped modulation symbols.

Another first wireless device for wireless communications is described. The first wireless device may include means for generating a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols, and means for transmitting the set of multiple shaped modulation symbols.

A non-transitory computer-readable medium storing code for wireless communications is described. The code may include instructions executable by one or more processors to generate a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols, and transmit the set of multiple shaped modulation symbols.

Some examples of the method, first wireless devices, and non-transitory computer-readable medium described herein may further include operations, features, means, or instructions for communicating a control message indicating the configuration for the entropy coding-based probabilistic shaping of data.

In some examples of the method, first wireless devices, and non-transitory computer-readable medium described herein, the range parameter, the bitwidth parameter, a quantity of bits for initializing the entropy coding state, or any combination thereof, may be determined based on a quadrature amplitude modulation (QAM) order, a quantity of shaped symbols per shaping block, a shaping distribution, or any combination thereof.

In some examples of the method, first wireless devices, and non-transitory computer-readable medium described herein, the quantity of bits for initializing the entropy coding state may be an integer quantity associated with an upper limit; and the bitwidth parameter may be divisible by the integer quantity of bits.

In some examples of the method, first wireless devices, and non-transitory computer-readable medium described herein, the range parameter may be a power of 2.

In some examples of the method, first wireless devices, and non-transitory computer-readable medium described herein, determining the probability distribution parameter may include operations, features, means, or instructions for determining the probability distribution parameter based on the quantity of remaining symbols, a frequency associated with remaining symbols to be generated of the quantity of remaining symbols, and a cumulative function.

In some examples of the method, first wireless devices, and non-transitory computer-readable medium described herein, the probability distribution parameter may be based on one or more previously generated shaped modulation symbols of the set of multiple shaped modulation symbols.

In some examples of the method, first wireless devices, and non-transitory computer-readable medium described herein, a lower boundary of the range interval may be based on a quantity of remaining symbols to be generated of the set of multiple shaped modulation symbols and the range parameter.

In some examples of the method, first wireless devices, and non-transitory computer-readable medium described herein, the entropy coding state may be scaled to occur within the range interval.

In some examples of the method, first wireless devices, and non-transitory computer-readable medium described herein, scaling the entropy coding state may include operations, features, means, or instructions for reading a quantity of bits from a bit buffer that stores bits associated with the entropy coding state, the quantity of bits based on the bitwidth parameter, removing the quantity of bits from the bit buffer after reading the quantity of bits from the bit buffer, and updating, after removing the quantity of bits from the bit buffer, the entropy coding state based on the quantity of bits read from the bit buffer.

In some examples of the method, first wireless devices, and non-transitory computer-readable medium described herein, updating the entropy coding state may include operations, features, means, or instructions for converting a binary value obtained from the quantity of bits read from the bit buffer to a decimal value, scaling the entropy coding state in accordance with the bitwidth parameter, and adding the decimal value to the scaled entropy coding state, where the updated entropy coding state may be based on a summation of the decimal value and the scaled entropy coding state.

In some examples of the method, first wireless devices, and non-transitory computer-readable medium described herein, the removed quantity of bits occupy an end set of bits of the bit buffer.

In some examples of the method, first wireless devices, and non-transitory computer-readable medium described herein, the entropy coding-based probabilistic shaping of data includes asymmetric numerical system (ANS) entropy coding.

A method for wireless communications by a second wireless device is described. The method may include obtaining a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol, and outputting a deshaped information vector based on the set of multiple shaped modulation symbols.

A second wireless device for wireless communications is described. The second wireless device may include one or more memories storing processor executable code, and one or more processors coupled with the one or more memories. The one or more processors may individually or collectively be operable to execute the code to cause the second wireless device to obtain a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol, and output a deshaped information vector based on the set of multiple shaped modulation symbols.

Another second wireless device for wireless communications is described. The second wireless device may include means for obtaining a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol, and means for outputting a deshaped information vector based on the set of multiple shaped modulation symbols.

A non-transitory computer-readable medium storing code for wireless communications is described. The code may include instructions executable by one or more processors to obtain a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol and output a deshaped information vector based on the set of multiple shaped modulation symbols.

Some examples of the method, second wireless devices, and non-transitory computer-readable medium described herein may further include operations, features, means, or instructions for communicating a control message indicating the configuration for the entropy coding-based probabilistic shaping of data.

In some examples of the method, second wireless devices, and non-transitory computer-readable medium described herein, the range parameter, the bitwidth parameter, a quantity of bits for initializing the entropy coding state, or any combination thereof, may be determined based on a QAM order, a quantity of shaped symbols per shaping block, a shaping distribution, or any combination thereof.

In some examples of the method, second wireless devices, and non-transitory computer-readable medium described herein, the quantity of bits for initializing the entropy coding state may be an integer quantity associated with an upper limit; and the bitwidth parameter may be divisible by the integer quantity of bits.

In some examples of the method, second wireless devices, and non-transitory computer-readable medium described herein, the range parameter may be a power of 2.

In some examples of the method, second wireless devices, and non-transitory computer-readable medium described herein, determining the probability distribution parameter may include operations, features, means, or instructions for determining the probability distribution parameter based on a quantity of shaped modulation symbols, the frequency associated with the quantity of shaped modulation symbols, and a cumulative function.

Some examples of the method, second wireless devices, and non-transitory computer-readable medium described herein may further include operations, features, means, or instructions for reversing an order of the set of multiple shaped modulation symbols relative to an initial order of receipt of the set of multiple shaped modulation symbols.

Some examples of the method, second wireless devices, and non-transitory computer-readable medium described herein may further include operations, features, means, or instructions for adding one or more padding bits to the deshaped information vector until a total quantity of bits of the deshaped information vector corresponds to a quantity of bits for initializing the entropy coding state.

In some examples of the method, second wireless devices, and non-transitory computer-readable medium described herein, a bit buffer associated with the second wireless device may be initialized as an empty buffer.

In some examples of the method, second wireless devices, and non-transitory computer-readable medium described herein, an upper boundary of the range interval may be based on the frequency associated with the subset of the set of multiple shaped modulation symbols and the range parameter.

In some examples of the method, second wireless devices, and non-transitory computer-readable medium described herein, the entropy coding state may be scaled to occur within the range interval.

In some examples of the method, second wireless devices, and non-transitory computer-readable medium described herein, scaling the entropy coding state may include operations, features, means, or instructions for generating a quantity of bits based on converting a decimal value associated with the entropy coding state to a binary value, the quantity of bits based on the bitwidth parameter and dividing the entropy coding state in accordance with the bitwidth parameter to obtain an intermediate entropy coding state or the scaled entropy coding state.

In some examples of the method, second wireless devices, and non-transitory computer-readable medium described herein, the decimal value associated with the entropy coding state may be a remainder of dividing the entropy coding state by a power of 2 scaled by the bitwidth parameter.

In some examples of the method, second wireless devices, and non-transitory computer-readable medium described herein, obtaining the deshaped information vector may include operations, features, means, or instructions for determining a binary expansion of a final entropy coding state and concatenating the binary expansion of the final entropy coding state to a set of multiple bits included in a bit buffer associated with the second wireless device to obtain the deshaped information vector.

In some examples of the method, second wireless devices, and non-transitory computer-readable medium described herein, the entropy coding-based probabilistic shaping of data includes ANS entropy coding.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 15 and 16 show flowcharts illustrating methods that support streaming and normalization for asymmetric numeral system-based probabilistic shaping in accordance with one or more aspects of the present disclosure.

DETAILED DESCRIPTION

In some wireless communications systems, wireless devices may implement modulation techniques. For example, a first wireless device and a second wireless device may implement quadrature amplitude modulation (QAM). As a part of QAM, the wireless devices may also implement probabilistic shaping to generate non-uniformly distributed QAM constellations. In some examples, the first wireless device and the second wireless device may implement entropy coding-based probabilistic shaping techniques, including asymmetric numeral system (ANS)-based algorithms for probabilistic shaping. However, conventional ANS-based algorithms may have implementation challenges for probabilistic shaping of a large quantity of symbols. For example, because ANS-based algorithms represent information for the symbols as an integer number, manipulation (e.g., multiplication) of such an integer number may encounter a loss of precision when the integer number is large.

Various aspects of the present disclosure are related to streaming and normalization for ANS-based probabilistic shaping. In some examples, a first wireless device (e.g., a transmitting wireless device) may generate a sequence of shaped symbols. Each shaped symbol may be based on an ANS state. To generate each shaped symbol of the sequence of shaped symbols, the first wireless device may normalize the ANS state at each symbol in accordance with a range interval. The first wireless device may determine the range interval for the shaped symbol based on one or more probability distribution parameters. If the ANS state for the shaped symbol is within the range interval, the first wireless device may stream (e.g., receive) and convert one or more bits (e.g., from a bit buffer of the first wireless device) into a decimal value and may add the decimal value to the ANS state. The first wireless device may transmit the sequence of shaped symbols after generating each of the shaped symbols. A second wireless device (e.g., a receiving wireless device) may receive the sequence of shaped symbols. For each shaped symbol, the second wireless device may generate information bits based on the ANS state for the shaped symbol. Once the second wireless device has received all of the shaped symbols of the sequence of shaped symbols, the second wireless device may obtain a deshaped information vector. The deshaped information vector may be based on the information bits generated for each shaped symbol and a final ANS state after obtaining all of the sequence of shaped symbols.

Aspects of the disclosure are initially described in the context of wireless communications systems. Aspects of the disclosure are additionally described with reference to signaling diagrams, operational flows, and process flows. Aspects of the disclosure are further illustrated by and described with reference to apparatus diagrams, system diagrams, and flowcharts that relate to streaming and normalization for asymmetric numeral system-based probabilistic shaping.

Figure 1:
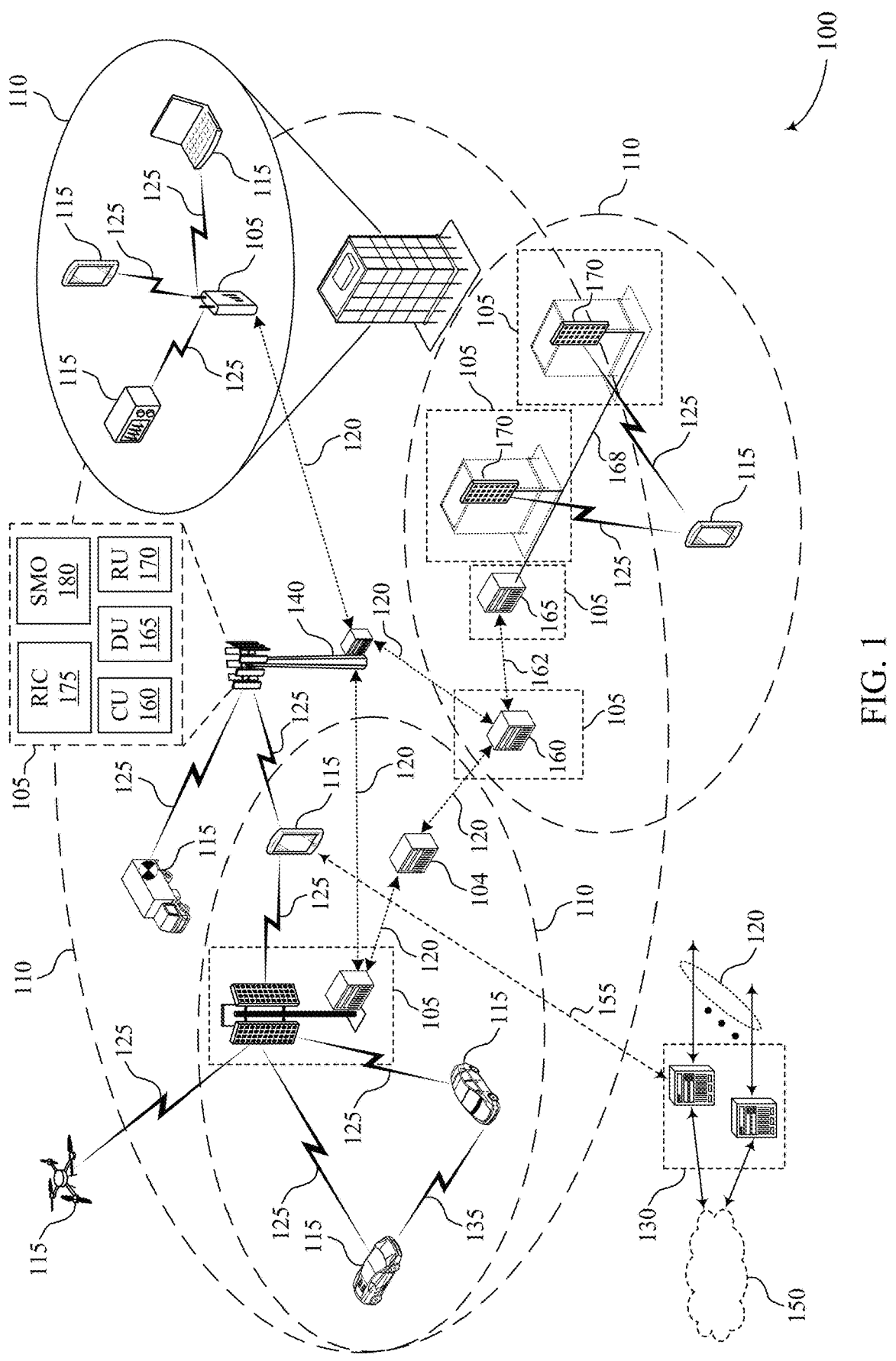
FIG. 1 shows an example of a wireless communications system that supports streaming and normalization for asymmetric numeral system-based probabilistic shaping in accordance with one or more aspects of the present disclosure.

FIG. 1 shows an example of a wireless communications system 100 that supports streaming and normalization for asymmetric numeral system-based probabilistic shaping in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support streaming and normalization for asymmetric numeral system-based probabilistic shaping as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a first wireless device (e.g., a transmitting device, a UE 115, a network entity 105) may generate a sequence of shaped symbols. Each shaped symbol may be based on an ANS state. To generate each shaped symbol of the sequence of shaped symbols, the first wireless device may normalize the ANS state at each symbol in accordance with a range interval. The first wireless device may determine the range interval for the shaped symbol based on one or more probability distribution parameters. If the ANS state for the shaped symbol is within the range interval, the first wireless device may stream (e.g., receive) and convert one or more bits (e.g., from a bit buffer of the first wireless device) into a decimal value and may add the decimal value to the ANS state. The first wireless device may transmit the sequence of shaped symbols after generating each of the shaped symbols.

A second wireless device (e.g., a receiving device, a network entity 105, a UE 115) may receive the sequence of shaped symbols. For each shaped symbol, the second wireless device may generate information bits based on the ANS state for the shaped symbol. In some examples, similar to the first wireless device, the second wireless device may generate the information bits if the ANS state for the shaped symbol lies outside of the range interval. The second wireless device may stream (e.g., output, write) the generated information bits to a bit buffer and may normalize the ANS state such that the ANS state lies within the range interval. Once the second wireless device has received all of the shaped symbols of the sequence of shaped symbols, the second wireless device may obtain a deshaped information vector. The deshaped information vector may be based on the information bits generated for each shaped symbol and a final ANS state after obtaining all of the sequence of shaped symbols.

Figure 2:
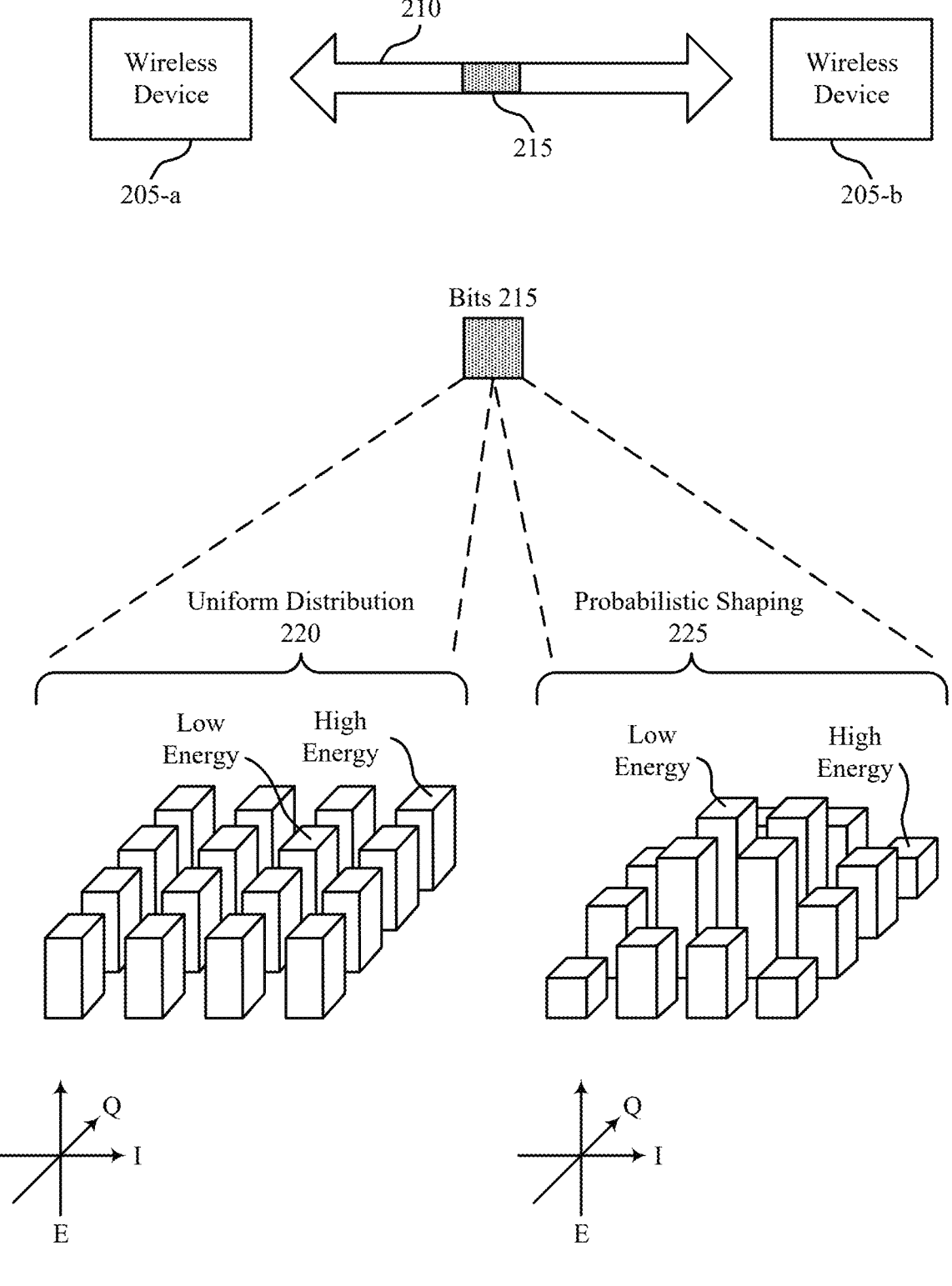
FIG. 2 shows an example of a wireless communications system that supports streaming and normalization for asymmetric numeral system-based probabilistic shaping in accordance with one or more aspects of the present disclosure.

FIG. 2 shows an example of a wireless communications system 200 that supports streaming and normalization for asymmetric numeral system-based probabilistic shaping in accordance with one or more aspects of the present disclosure. The wireless communications system 200 may implement aspects of the wireless communications system 100. For example, the wireless communications system 200 may include a first wireless device 205-a and a second wireless device 205-b, which may be examples of corresponding devices described herein (e.g., a network entity 105, a UE 115). The first wireless device 205-a may communicate with the second wireless device 205-b via the communication link 210, which may be an uplink, a downlink, a sidelink, or any combination thereof. A device transmitting a signal, or a message, (e.g., in the uplink, downlink, or sidelink) may be referred to as a transmitting device, and a device receiving the transmitted signal (e.g., in the uplink, downlink, or sidelink) may be referred to as a receiving device.

Generally, the wireless communications system 200 illustrates an example of the first wireless device 205-a and the second wireless device 205-b communicating via the communication link 210. For example, the first wireless device 205-a, the second wireless device 205-b, or both, may transmit a signal modulated to represent one or more bits 215. For example, the one or more bits 215 may be transmitted via a message including a distribution of modulated symbols, where each symbol in the distribution may represent one or more bits. The first wireless device 205-a and the second wireless device 205-b may perform a higher-order modulation operation (e.g., 16 quadrature amplitude modulation (QAM), 64 QAM, 256 QAM, 1024QAM, 4096QAM to convert a uniform distribution 220 into a non-uniform modulation constellation using probabilistic shaping 225.

Some wireless communications systems (e.g., cellular, Wi-Fi) may utilize higher order modulation to increase spectral efficiency for wireless transmissions at higher signal-to-noise-ratio (SNR) values. In such systems, constellations of modulated symbols may be fixed (e.g., may be square constellations), where each constellation point (e.g., value, symbol) may have a same probability of being used as another constellation point (e.g., each constellation point may be used with equal probability). In some examples, as information rate increases, the SNR of uniform modulation (e.g., 16 QAM, 64 QAM, 256 QAM, quadrature phase shift keying (QPSK)) as well as probabilistic shaping (e.g., a uniform distribution 220 with a same energy (E) for each constellation point defined by I (in-phase carrier) on the X axis and Q (quadrature carrier) on the Y axis). Optimized constellation distribution may plateau (e.g., initially, for a given modulation scheme or shaping scheme, an increase in SNR may result in an increase in information rate, however at some point, SNR may continue to increase while information rate remains the same). Probabilistic shaping may plateau at the same information rate as the 256 QAM, and plateau at higher information rates than other uniform QAM.

In some cases, the distribution of the constellation points (e.g., the distribution of the amplitude of the modulation constellation) may be shaped such that different symbols may have different probabilities of usage, where such a distribution may be referred to as a non-uniform distribution of symbols. For example, a non-uniform distribution of symbols may include a first set of symbols with respective probabilities of usage below a first probability level and a second set of symbols with respective probabilities of usage above or equal to the first probability level. In such cases, the first set of symbols may include one or more probabilities below the first probability level (e.g., different probabilities below the first probability level) and the second set of symbols may include one or more probabilities above or equal to the first probability level (e.g., different probabilities above or equal to the first probability level).

A non-uniform distribution (e.g., Gaussian-like distribution) of the constellation points may be shaped using one or more probabilistic shaping techniques (e.g., according to probabilistic shaping 225). Probabilistic shaping may be a technique used to increase spectral efficiency of the coded modulation, and may generate non-uniformly distributed coded modulation symbols, or non-uniformly distributed constellations. In some examples, non-uniformly distributed QAM may have a higher capacity than a uniformly distributed QAM. Such non-uniform distributions may result in higher transmission capacities, higher spectral efficiencies, or generally higher communication quality than uniform symbol distributions. For example, non-uniformly distributed constellations may be associated with a larger mutual information (e.g., an information I, defined by parameters X and Y) than uniformly distributed constellations, at the same SNR. Non-uniformly distributed constellations (e.g., a Maxwell-Boltzmann distribution) may maximize a source entropy for a given average power. In such cases, inner constellations of the non-uniformly distributed constellations may be used with higher probability levels.

An example of a probabilistic shaping framework (e.g., for generating probabilistic shaping 225) may be probabilistic amplitude shaping (PAS) (e.g., distribution matching). PAS may shape an amplitude of a constellation of modulated symbols (e.g., the amplitude may be non-uniform), while leaving the sign of the constellation uniformly distributed. In some examples, PAS may be performed prior to channel coding of information bits. In some examples, PAS may perform shaping on information bits (e.g., shaping the bits for distribution into a non-uniform constellation of symbols), and may utilize systematic channel codes. For example, PAS may use a systematic channel code to preserve the shaping applied to the information bits (e.g., the shaping may be preserved during channel coding, which may occur after shaping). In PAS, parity bits may not be shaped, and instead may be mapped to the signs of the constellations (e.g., which signs may not be shaped in PAS).

In some examples, PAS may be based on source compression techniques, such as arithmetic coding or Huffman coding. Source coding may convert non-uniformly distributed sources into uniform bits, and PAS may reverse the conversion. For example, PAS may shape the information bits to a given probability distribution, followed by the use of a high rate systematic code to encode the shaped information bits. Using a high rate systematic code may preserve the distribution on the information bits. In some cases, the source code may be non-linear. In some other examples, the PAS may be based on channel coding (e.g., polar code-based, Trellis code-based), which may generate masking bits to mask the information bits to a specific distribution.

Techniques for arithmetic coding may include CCDM (constant-composition distribution matching), multi-CCDM (multiple composition distribution matching), sphere shaping (constraining the input codeword (a multi-dimensional complex vector) into a power sphere), energy-based shaping, or any combination thereof. In some examples, PAS may implement arithmetic coding to maintain asymptotic entropy of the source waveform. However, implementing arithmetic coding for PAS may introduce additional complexity. For example, variable length of data to be shaped using PAS may introduce instability to arithmetic coding-based shaping (e.g., due to the manipulation of large-order numbers).

In some examples, PAS may be based on asymmetric numeral system (ANS) coding, which may be another type of entropy coding. ANS may be associated with similar compression performance when compared to arithmetic coding and may be associated with similar compression speed when compared to Huffman coding. To implement ANS for PAS, wireless devices 205 may use adaptive ANS algorithms. In an adaptive ANS algorithm, an ANS encoder (e.g., a receiving device) may build a probability model. An ANS decoder (e.g., a transmitting device) may use the probability model (e.g., may use same probability parameters as the ANS encoder) to generate shaped symbols. Adaptive ANS algorithms may achieve fixed-to-fixed mapping (e.g., between parity bits and constellation sign) for shaping data of variable length. ANS performance may improve when a number of symbols to be shaped (e.g., a block length) is small (e.g., less than 100 information bits). For example, ANS algorithms may represent shaped information (e.g., a state of shaped information) using a large integer number. As the length of a symbol sequence increases, ANS algorithms may perform multiplication on the large integer number, which may cause a loss of precision as the order of the large integer number increases.

In CCDM, the goal may be to efficiently and uniquely assign an index (e.g., a binary expansion of the index) to a symbol sequence in a set of symbol sequences with a given fixed composition. In an example, a set of symbols to be shaped (e.g., of a symbol sequence) may be represented by the array $S=\{a_1, \ldots, a_L\}$, where L is selected to be a power of 2. A target composition may be represented by the array $m=[m_1, \ldots, m_L]$, where an arbitrary quantity $m_j$ denotes a frequency of a corresponding symbol $a_j$ in the set of symbols S. The sum of the target composition, which may be represented by the quantity $M=m_1+\ldots+m_L$, may denote the length of the set of symbols S (e.g., the symbol sequence). A total number of sequences with a fixed composition $[m_1, \ldots, m_L]$ may be computed via the multinomial equation $$\binom{M}{m_1, m_2, \ldots, m_L} = \frac{M!}{m_1!m_2! \ldots m_L!}.$$

ANS-based shaping may assign a unique symbol sequence of composition $[m_0, \ldots, m_{L-1}]$ to an arbitrary binary sequence with length $$K = \left\lfloor \log_2 \binom{M}{m_1, m_2, \ldots, m_L} \right\rfloor.$$

However, ANS-based shaping may experience inefficiency in cases where K is large. For example, if K=8000 and M=O (1000), the number of unique symbol sequences may be on the order of $2^{8000}$.

To accommodate block lengths of arbitrarily large sizes with finite precision (e.g., 16 bit precision), ANS algorithms may implement normalization and streaming techniques. By implementing normalization techniques, the ANS algorithm may control an ANS state (e.g., the state of shaped information) such that the ANS state is forced to lie within a fixed interval (e.g., interval [L, U), with inclusive lower bound L and exclusive upper bound U). In this way, the ANS algorithm may prevent the ANS state from growing unbounded with increasing data volume (e.g., increasing block length). To normalize the ANS state, the ANS algorithm may perform a modulo operation on the ANS state (e.g., $X_t$) with respect to the upper bound U. To avoid information loss during encoding the source symbols, the ANS algorithm may also output (e.g., stream out) information (e.g., information bits) associated with the quotient of the modulo operation (e.g., $X_t/U$) for each shaped symbol (e.g., at each step of an ANS encoding operation). By implementing streaming techniques, the ANS algorithm may output the information bits before the ANS algorithm has fully encoded the source symbols. In this way, the ANS algorithm may prevent the ANS state from growing unbounded while maintaining the original information of the source symbols during symbol encoding. Decoding using ANS may be performed similarly to encoding using ANS, but in reverse.

For example, the ANS decoder may receive (e.g., stream in) information bits during decoding to perform denormalization. ANS streaming may be associated with additional parameters, including a range parameter l and a bitwidth parameter b (e.g., how many bits to output for each normalization operation). The range parameter l, the bitwidth parameter b, or both may be configurable. Additionally, or alternatively, the range parameter l, the bitwidth parameter b, or both may be defined as positive integers (e.g., positive integer quantities).

In some ANS streaming techniques, the ANS algorithm may determine the interval based on fixed statistics (e.g., the probability distribution) associated with the data. However, for PAS, the probability distribution may vary for each symbol (e.g., at each ANS encoding step). To implement ANS streaming for PAS, the ANS algorithm may adapt or modify the interval to account for changes to the probability distribution. To do this, the ANS algorithm may perform normalization using different intervals for each symbol to be shaped (e.g., at each step).

The ANS algorithm may be designed such that the interval (e.g., in which the ANS state lies) that the ANS algorithm uses for normalization of a symbol at the ANS encoder and for denormalization of a symbol at the ANS decoder matches the probability distribution model used by the ANS algorithm for that symbol (e.g., at that step). Additionally, the ANS algorithm may be designed such that the ANS encoding operation is reversable at the ANS decoder. In cases where the ANS encoding operation is not reversable at the ANS decoder, the ANS decoder may be unable to recover information transmitted by the ANS encoder even if the ANS decoder does not experience errors (e.g., channel errors) when receiving the information. The ANS algorithm may generate a shaping scheme that maintains the fixed-to-fixed mapping between the parity bits and the constellation signs. Additionally, the ANS algorithm may be designed such that implementing normalization and streaming does not decrease shaping efficiency relative to ANS algorithms that do not implement normalization and streaming.

Figure 4:
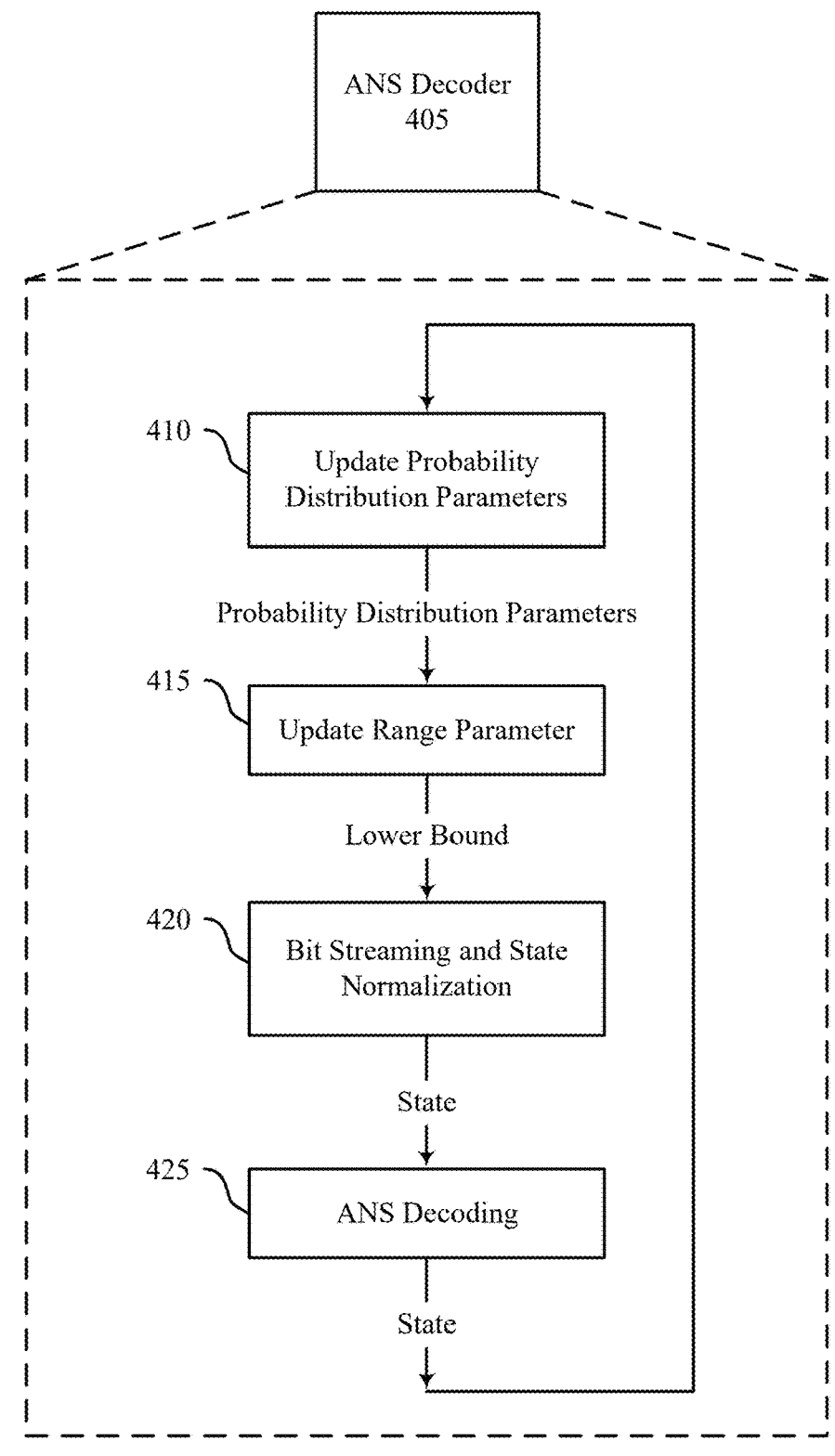
FIG. 4 shows an example of an operational flow that supports streaming and normalization for asymmetric numeral system-based probabilistic shaping in accordance with one or more aspects of the present disclosure.

Operations performed by an ANS encoder (e.g., a transmitting device) for performing ANS-based probabilistic shaping are described in further detail herein with respect to FIG. 4. Operations performed by an ANS decoder (e.g., a receiving device) for performing ANS-based probabilistic shaping are described in further detail herein with respect to FIG. 5.

Figure 3:
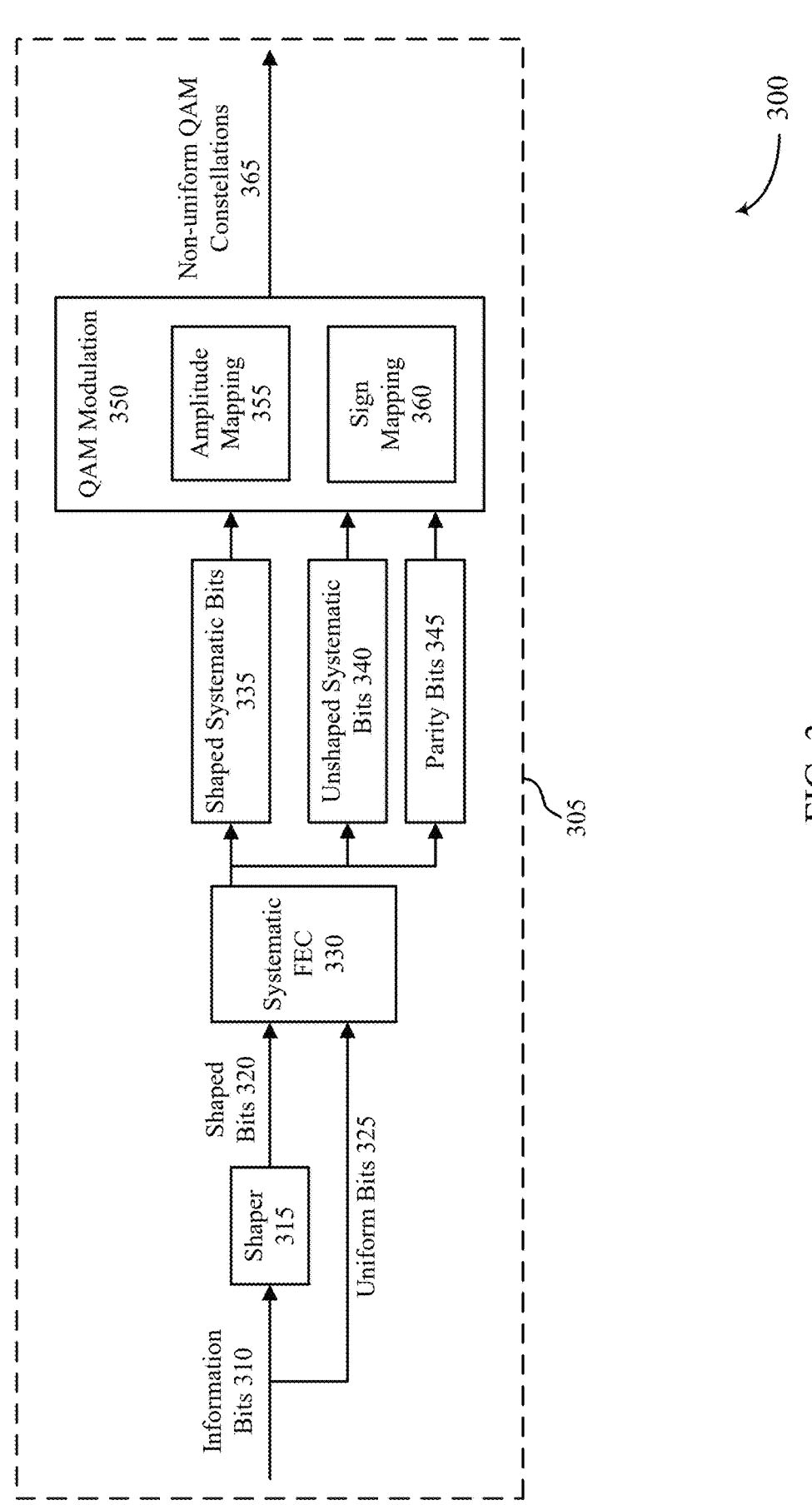
FIG. 3 shows an example of a signaling diagram that supports streaming and normalization for asymmetric numeral system-based probabilistic shaping in accordance with one or more aspects of the present disclosure.

FIG. 3 shows an example of a signaling diagram 300 that supports streaming and normalization for asymmetric numeral system-based probabilistic shaping in accordance with one or more aspects of the present disclosure. The signaling diagram 300 may implement aspects of the wireless communications system 100, the wireless communications system 200, or both, or may be implemented by aspects of the wireless communications system 100, the wireless communications system 200, or both. For example, the signaling diagram 300 may be an example of communications between the first wireless device 205-a and the second wireless device 205-b as described herein with reference to FIG. 2. In some examples, a wireless device 305 (e.g., a transmitting device) may perform joint LDPC coding and modulation according to the signaling diagram 300.

In some examples, in accordance with probabilistic shaping (such as probabilistic amplitude shaping (PAS)), the wireless device 305 may input information bits 310 (e.g., an information payload, a set of input bits associated with a data message) into a shaper 315, which may be a probabilistic shaper. In some examples, the shaper 315 may shape all of the information bits 310, output a set of shaped bits 320, and input the set of shaped bits 320 into the FEC encoder 330. In some other examples, the shaper 315 may shape a portion of the information bits 310, output the set of shaped bits 320 and a set of uniform bits 325, and may input the two sets of bits into a forward error correction (FEC) encoder 330. The shaper 315 may transform some or all of the information bits 310 (e.g., the set of uniform bits 325) into non-uniformly distributed bits (e.g., the set of shaped bits 320) according to a given target probability distribution. The wireless device 305 may additionally input a set of parity bits into the FEC encoder 330 associated with the information payload. In some aspects, the FEC encoder 330 may be a high rate systematic FEC encoder.

The FEC encoder 330 may output a set of shaped bits 335 (e.g., information bits, systematic bits) and a set of parity bits 345. Additionally, in some cases where the FEC encoder 330 receives the set of uniform bits 325 as an input (e.g., from the shaper 315), the FEC encoder may output a set of unshaped bits 340 (e.g., information bits, systematic bits). In such cases, the set of parity bits 345 may also be unshaped. The wireless device 305 may modulate the set of shaped bits 335, the set of unshaped bits 340, the set of parity bits 345, or any combination thereof, using QAM modulation 350. For example, the wireless device 305 may perform amplitude mapping 355 to map the set of shaped bits 335, which may be non-uniformly distributed or biased, to an amplitude of one or more constellation points of a modulation constellation (e.g., a QAM modulation constellation). Similarly, the wireless device 305 may perform sign mapping 360 to map the set of unshaped bits 340, which may be uniformly distributed or unbiased, and the set of parity bits 345 to a sign of one or more constellation points of the modulation constellation. As such, for a given constellation point, an amplitude of the constellation point may be shaped while a sign of the constellation point may remain unshaped (and associated with a uniform distribution). In some examples, the resulting modulation symbols of the modulation constellation may be non-uniformly distributed. In some aspects, the modulation constellation may be associated with the QAM modulation 350 and an output of the QAM modulation 350 may be non-uniformly distributed QAM constellations 365.

A second device (e.g., a receiving device) may receive information bits encoded in a signal or symbols according to the base graph. For example, the second device may receive an indication of a modulation constellation that may include the signal. In some examples, the second device may demodulate the received signal or symbols. The second device may further demap (e.g., demodulate) coded bits from a modulation constellation. In some cases, the second device may decode the coded bits after unmapping the bits. In such cases, the second device may demultiplex the now decoded information bits. The second device may then perform a de-shaping procedure (e.g., compress a non-uniform distribution into a uniform distribution) on the non-uniformly distributed bits. Finally, the second device may multiplex the de-shaped data to receive the information bits.

FIG. 4 shows an example of an operational flow 400 that supports streaming and normalization for asymmetric numeral system-based probabilistic shaping in accordance with one or more aspects of the present disclosure. The operational flow 400 may illustrate an example process performed by an ANS decoder 405 for performing ANS-based probabilistic shaping. In some examples, the ANS decoder 405 may communicate with an ANS encoder (not shown), both of which may be examples of corresponding devices and features described herein, including with reference to FIG. 2. For example, the ANS decoder 405 may be an example of a transmitting device (e.g., a transmitting wireless device 205) as described with reference to FIG. 2. In some examples, the ANS decoder 405 may be an example of a UE (e.g., a UE 115 as described with reference to FIG. 1), and the ANS encoder may be an example of a network entity (e.g., a network entity 105 as described with reference to FIG. 1). The ANS decoder 405 may shape a sequence of multiple symbols (e.g., modulation symbols) using an ANS algorithm. The ANS decoder 405 may perform a quantity M steps, where M corresponds to a quantity of symbols (e.g., of the sequence) to be shaped M by the ANS decoder 405.

The ANS decoder 405 may determine a configuration for performing ANS-based probabilistic shaping. The configuration may include multiple parameters, including the streaming parameters described with reference to FIG. 2 (e.g., the range parameter l and the bitwidth parameter b, which may be elements of a set Z), a quantity of bits $K_0$ used to initialize an ANS state X (e.g., determine an initial state $X_0$ of the ANS-based probabilistic shaping), and the quantity of symbols to be shaped M. In some examples, the ANS decoder 405 may communicate the configuration (e.g., an indication of the configuration) with the ANS encoder. For example, the ANS decoder 405 (e.g., as part of a first wireless device, such as a UE or gNB) may communicate (e.g., transmit, receive) the multiple parameters with the ANS encoder (e.g., as part of a second wireless device, such as a UE or gNB) via control signaling.

In some examples, the parameters l, b, $K_0$, or any combination thereof, may be associated with (e.g., determined based on) one or more factors or one or more additional parameters, including a modulation order (e.g., a QAM order), a quantity of shaped symbols per shaping block, a shaping distribution, or any combination thereof. The ANS decoder 405 may additionally select values for the parameters l, b, $K_0$, or any combination thereof, in accordance with one or more guidelines. For example, the ANS decoder 405 may select $K_0$ to be an integer that is no larger than (e.g., limited by) the quantity $[\log_2(2^b lM-1)]$. In some cases, $K_0$ may be set to (e.g., fixed to) a value of zero. Similarly, the ANS decoder 405 may select l such that the value of l is large enough to avoid shaping inefficiency (e.g., relative to ANS-based probabilistic shaping without normalization and streaming). In some cases, the ANS decoder 405 may determine l empirically (e.g., as a function of M and the modulation order) and store l in a lookup table. The ANS decoder 405 may select l to be a power of 2 to simplify mathematical operations (e.g., arithmetic operations) at the ANS decoder 405 for performing ANS-based probabilistic shaping. The ANS decoder 405 may select b such that b is divisible by a quantity of information bits prior to shaping K (e.g., such that the modulo of K and b is zero, mod(K,b)=0).

The ANS decoder 405 may obtain (e.g., receive) a sequence of data bits to be shaped, which may be denoted by the sequence $b_0, \ldots, b_{K-1}$. The ANS decoder 405 may use the last $K_0$ bits of the sequence of data bits (e.g., bits $[b_{K-K_0}, \ldots, b_{K-1}]$) to initialize the ANS state (e.g., $X=X_0$). In some cases where $K_0$ is set to zero, the ANS decoder 405 may initialize the initial state $X_0$ with a value of zero. The ANS decoder 405 may store the remaining $K-K_0$ bits of the sequence of data bits to a bit buffer of the ANS decoder 405. The ANS decoder 405 may update the bit buffer at each step M.

To generate a sequence of shaped symbols, the ANS decoder 405 may perform M steps. At each step q of the M steps (e.g., for each symbol of the quantity of symbols to be shaped M), the ANS decoder 405 may generate a shaped symbol based on an ANS state $X_M$ for the current step q. To generate each shaped symbol of the sequence of shaped symbols, the ANS decoder may perform the operations described by the operational flow 400.

At 410, the ANS decoder 405 may determine one or more probability distribution parameters for an arbitrary step q (e.g., the current step q), which may belong to a set of steps $\{1, 2, \ldots, M\}$. The ANS decoder 405 may determine the one or more probability distribution parameters based on a target shaping distribution. Additionally, the ANS decoder 405 may further determine the probability distribution parameters based on a quantity of symbols that have already been generated. For example, for the arbitrary step q, the ANS decoder 405 may further determine the probability distribution parameters based on the symbols $s_0, \ldots, s_{q-2}$ generated from step 1 to step q−1. The probability distribution parameters may include a quantity of remaining symbols to be generated $N_q=M-q+1$. Additionally, the probability distribution parameters may include a frequency $$[n_1^q, \ldots, n_L^q]$$

of the remaining symbols to be generated. The ANS decoder 405 may determine the frequency based on the composition of the remaining symbols $N_q$. For example, the ANS decoder 405 may determine the frequency of a symbol with symbol index j in accordance with Equation 1 below.

$$n_j^q = m_j - \#\{0 \le k \le q - 2 : s_k = a_j\} \tag{1}$$

As described herein, $m_j$ may represent a target composition of a symbol $a_j$, which may be the k-th symbol $s_k$ of the set of symbols s. The # notation may denote a quantity of elements of the set $0 \le k \le q-2$ (e.g., a quantity of indices k between 0 and q−2) such that a previously-generated symbol $s_k$ is the same as (e.g., equal to) the symbol $a_j$. Accordingly, the ANS decoder 405 may determine the frequency $$n_j^q$$

for a symbol $a_j$ by subtracting the quantity of previously-generated symbols that are equal to the symbol $a_j$ from the target composition $m_j$. The probability distribution parameters may further include a cumulative function $C^q(\cdot)$. The ANS decoder 405 may determine the cumulative function from the frequency $$[n_1^q, \ldots, n_L^q].$$

At 415, the ANS decoder 405 may update a range associated with normalizing an ANS state X (e.g., an ANS state $X_{M-q-1}$) based on the range parameter l in accordance with Equation 2 below.

$$\text{range} = [l \cdot N^q, l \cdot 2^b \cdot N^q - 1] \tag{2}$$

A lower bound $L_q$ of the range may correspond to the first quantity $1 \cdot N^q$ of Equation 1, and an upper bound $U_q$ of the range may correspond to the second quantity $1 \cdot 2^b \cdot N^q - 1$ of Equation 2. For each of the M steps, the ANS decoder 405 may determine the upper bound $U_q$ from the lower bound $L_q$ in accordance with Equation 3 below.

$$U_q = 2^b L_q - 1 \qquad (3)$$

$L_q$ may be equal to $1 \cdot N^q$ as described herein. Accordingly, the ANS decoder 405 may only maintain one of the lower bound $L_q$ and the upper bound $U_q$ when implementing ANS algorithms for probabilistic shaping.

In some cases, the lower bound $L_q$ may increase by 1 after each step (e.g., from step q to step q−1). In such cases, the ANS decoder 405 may select 1 to be a power of 2 to simplify mathematical operations (e.g., multiplication operations, addition operations) for updating the range parameter 1.

At 420, the ANS decoder 405 may stream in bits and normalize an ANS state $X_{M-q-1}$. In some examples, the ANS decoder 405 may evaluate the ANS state $X_{M-q-1}$ with respect to the lower bound $L_q$ (e.g., $1 \cdot N^q$). If the ANS decoder 405 determines that the ANS state $X_{M-q-1}$ falls outside of the lower bound $L_q$ (e.g., $X_{M-q-1} < 1 \cdot N^q$) and that the bit buffer is not empty, the ANS decoder 405 may normalize the ANS state $X_{M-q-1}$. As described herein, the ANS decoder 405 may maintain the lower bound $L_q$.

To normalize the ANS state $X_{M-q-1}$, the ANS decoder 405 may take (e.g., obtain, read, stream in) a quantity of bits from the bit buffer. The ANS decoder 405 may take the last b bits of the bit buffer, denoted by the sequence $d_0, \ldots, d_{b-1}$. After taking the b bits from the bit buffer, the ANS decoder 405 may remove the b bits from the bit buffer. After removing the b bits from the bit buffer, the ANS decoder 405 may update the ANS state $X_{M-q-1}$. To update the ANS state $X_{M-q-1}$, the ANS decoder 405 may perform a conversion operation on the b bits from the bit buffer. For example, the ANS decoder 405 may convert a binary value associated with (e.g., communicated by, indicated by) the b bits from the bit buffer to a decimal value in accordance with Equation 4 below.

$$X_{M-q-1} = BinaryToDecimal([d_0, \ldots, d_{b-1}]) + X_{M-q-1} \cdot 2^b \qquad (4)$$

At 425, the ANS decoder 405 may apply the ANS decoding to generate a next shaped symbol $s_{q-1}$ using the probability distribution parameters. For example, the ANS decoder 405 may use the quantity of remaining symbols to be generated Ng and the cumulative function $C^q(\cdot)$. In some examples, the ANS decoder 405 may generate the next shaped symbol $s_{q-1}$ in accordance with Equation 5 and Equation 6 below.

$$slot = mod \ (X_q, N^q) \qquad (5)$$

$$s_{q-1} = C^q_{inv} \ (slot) \qquad (6)$$

In some other examples, the ANS decoder 405 may implement ANS algorithms for probabilistic shaping in hardware using binary arithmetic, where the hardware of the ANS decoder 405 may only recognize bits. In such cases, the ANS decoder 405 may normalize the ANS state $X_{M-q-1}$ using a bit shift operation. That is, the ANS decoder 405 may refrain from normalizing the ANS state $X_{M-q}$ in accordance with Equation 5 and Equation 6 (e.g., may refrain from performing modulo operations, division operations, or both). Additionally, the ANS decoder 405 may update the ANS state in accordance with Equation 7 below.

$$X_{M-q} = \left\lfloor \frac{X_{M-q+1}}{N^q} \right\rfloor \cdot F(s_{q-1}) + slot - C^q(s_{q-1}) \qquad (6)$$

$X_{M-q+1}$ may represent the ANS state for the next symbol $s_{q-1} \cdot X_{M-q+1}$ may represent the normalized ANS state $X_{M-q-1}$. In some examples, the normalized ANS state $X_{M-q-1}$ may lie within the range parameter (e.g., the interval $[1 \cdot N^q, 1 \cdot 2^b \cdot N^q - 1]$. Accordingly, the normalized ANS state $X_{M-q-1}$ may have a bitwidth that is less than $[\log_2 (2^b 1M - 1)]$. The ANS decoder 405 may use the updated ANS state $X_{M-q}$ to generate a next symbol in the sequence of shaped symbols. For example, the ANS decoder 405 may use the updated ANS state $X_{M-q}$ to determine one or more probability distribution parameters for a following arbitrary step $q+1$ of the set of steps {1, 2, . . . , M}.

Figure 5:
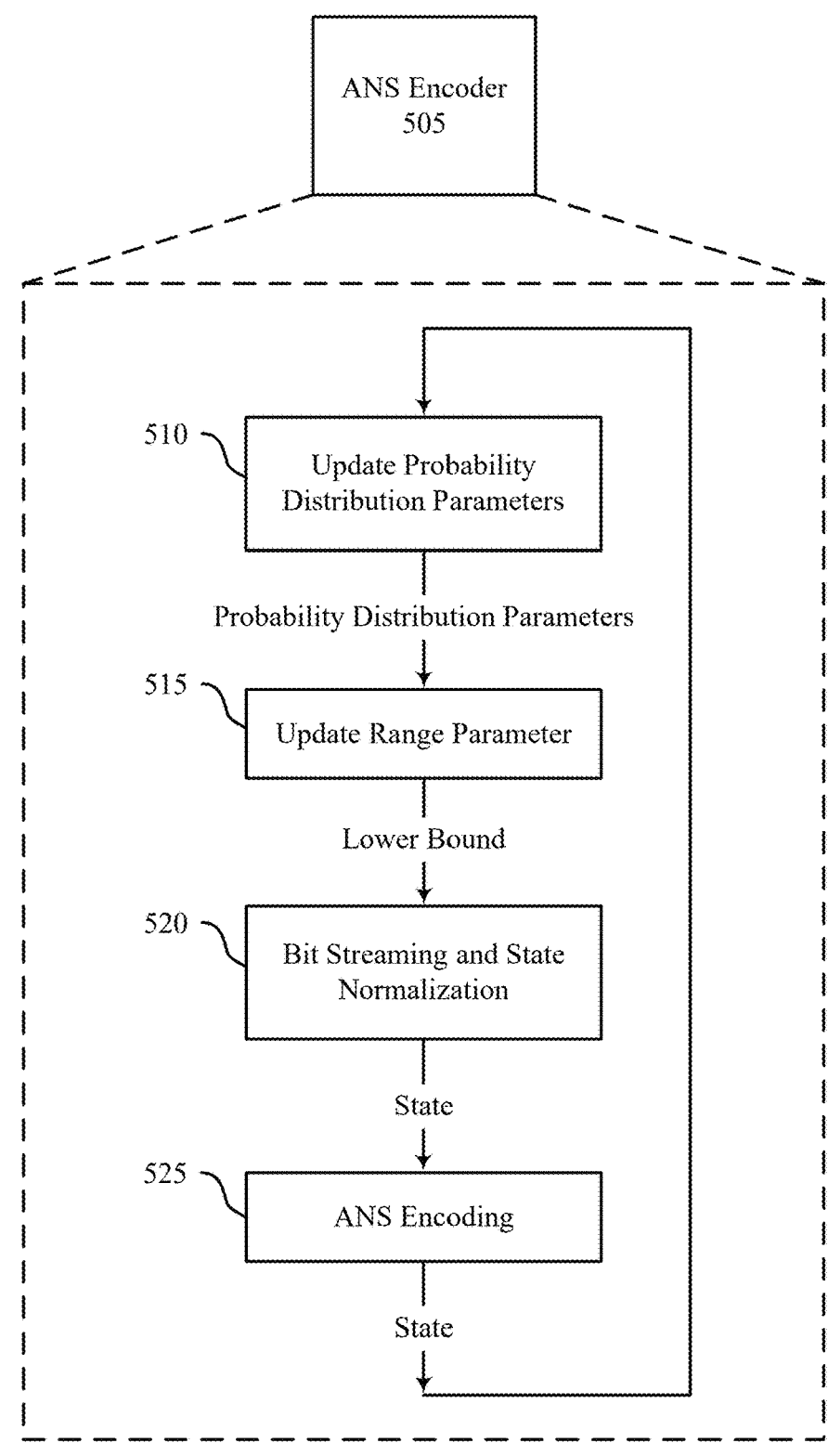
FIG. 5 shows an example of an operational flow that supports streaming and normalization for asymmetric numeral system-based probabilistic shaping in accordance with one or more aspects of the present disclosure.

The ANS decoder 405 may repeat the steps 410 through 425 of the operational flow 400 a quantity M times until all of the shaped symbols (e.g., corresponding to the quantity of symbols to be shaped M) have been generated. That is, the ANS decoder 405 may repeat the steps 410 through 425 of the operational flow 400 a quantity M times to generate the sequence of shaped symbols. After generating the sequence of shaped symbols, a UE 115 or other wireless device that includes the ANS decoder 405 may transmit the sequence of shaped symbols to a receiving device that includes an ANS encoder. In some examples, the UE 115 or other wireless device may transit the sequence of shaped symbols to the receiving wireless device via a wireless channel FIG. 5 shows an example of an operational flow 500 that supports streaming and normalization for asymmetric numeral system-based probabilistic shaping in accordance with one or more aspects of the present disclosure. The operational flow 500 may illustrate an example process performed by an ANS encoder 505 for performing ANS-based probabilistic shaping. In some examples, the ANS encoder 505 may communicate with an ANS decoder (not shown), both of which may be examples of corresponding devices and features described herein, including with reference to FIG. 2. For example, the ANS encoder 505 may be an example of a receiving device (e.g., a receiving wireless device 205) as described with reference to FIG. 2. In some examples, the ANS encoder 505 may be an example of a UE (e.g., a UE 115 as described with reference to FIG. 1), and the ANS encoder may be an example of a network entity (e.g., a network entity 105 as described with reference to FIG. 1) The ANS encoder 505 may deshape a sequence of multiple symbols (e.g., modulation symbols) using an ANS algorithm. The ANS encoder 505 may perform a quantity M steps, where M corresponds to a quantity of symbols (e.g., of the sequence) to be deshaped M by the ANS encoder 505.

The ANS encoder 505 may determine a configuration for performing ANS-based probabilistic shaping. The configuration may include multiple parameters, including the streaming parameters described with reference to FIG. 2 (e.g., the range parameter 1 and the bitwidth parameter b, which may be elements of a set Z), a quantity of bits $K_0$ used to initialize an ANS state X (e.g., determine an initial state $X_0$ of the ANS-based probabilistic shaping), and the quantity of symbols to be deshaped M. In some examples, the ANS encoder 505 may communicate the configuration (e.g., an indication of the configuration) with the ANS decoder. For example, the ANS encoder 505 may communicate (e.g., transmit, receive) the multiple parameters with the ANS decoder via control signaling.

In some examples, the parameters l, b, $K_0$, or any combination thereof, may be associated with (e.g., determined based on) one or more factors or additional parameters, including a modulation order (e.g., a QAM order), a quantity of shaped symbols per shaping block, a shaping distribution, or any combination thereof. The ANS encoder 505 may additionally select values for the parameters l, b, $K_0$, or any combination thereof, in accordance with one or more guidelines. For example, the ANS encoder 505 may select $K_0$ to be an integer that is no larger than (e.g., limited by) the quantity $[\log_2(2^b \, lM-1)]$. Similarly, the ANS encoder 505 may select l such that the value of l is large enough to avoid shaping inefficiency (e.g., relative to ANS-based probabilistic shaping without normalization and streaming). In some cases, the ANS encoder 505 may determine l empirically (e.g., as a function of M and the modulation order) and store l in a lookup table. The ANS encoder 505 may select l to be a power of 2 to simplify mathematical operations (e.g., arithmetic operations) at the ANS encoder 505 for performing ANS-based probabilistic shaping. The ANS encoder 505 may select b such that b is divisible by a quantity of information bits prior to shaping K (e.g., such that the modulo of K and b is zero, mod(K,b)=0).

The ANS encoder 505 may obtain (e.g., receive) a sequence of shaped symbols to be deshaped (e.g., after performing channel decoding), which may be denoted by the sequence $s=[s_0, \ldots, s_{M-1}]$. In some examples, the ANS encoder 505 may reverse the sequence s to obtain a reversed sequence $s_{rev}=[s_{M-1}, \ldots, s_0]$. Additionally, the ANS encoder 505 may initialize the ANS state (e.g., X=0).

To deshape the sequence of shaped symbols (e.g., the reversed sequence $s_{rev}$), the ANS encoder 505 may perform M steps. At each step M (e.g., for each symbol of the quantity of symbols to be shaped M), the ANS encoder 505 may consume a shaped symbol $s_t$ and may generate a quantity of information bits. The quantity of information bits may be a multiple of the bitwidth parameter b (e.g., 0 bits, b bits, 2b bits, etc.). The ANS encoder 505 may generate (e.g., write, store) the information bits to a bit buffer of the ANS encoder 505. In some examples, the ANS encoder 505 may initialize the bit buffer as empty (e.g., as an empty buffer).

At 510, the ANS encoder 505 may determine probability distribution parameters for an arbitrary step t, which may belong to a set of steps {1, 2, . . . , M}. The ANS encoder 505 may determine the probability distribution parameters based on partial symbols $s_{M-1}, \ldots, s_{M-t}$. The partial symbols $s_{M-1}, \ldots, s_{M-t}$ may be (e.g., include) the first t symbols of the reversed sequence $s_{rev}$. The probability distribution parameters may include a quantity of symbols that have already been deshaped $N_t=t$. Additionally, the probability distribution parameters may include a frequency $$[n_1^t, \ldots, n_L^t]$$

of the symbols $a_1, \ldots, a_L$ of the partial sequence $[s_{M-1}, \ldots, s_{M-t}]$. The ANS encoder 505 may determine the frequency based on the first t symbols of the reversed sequence $s_{rev}$. For example, the ANS encoder 505 may determine the frequency $F^t$ in accordance with Equation 7 below.

$$F^t(S_{M-t} = j) = n_j^t \tag{7}$$

As described herein, $$n_j^t$$

may represent a frequency of a symbol $s_j$, which may be the j-th symbol of the set of symbols S. The probability distribution parameters may further include a cumulative function $C^t(\cdot)$. The ANS encoder 505 may determine the cumulative function from the frequency $$[n_1^t, \ldots, n_L^t].$$

in some examples, the cumulative function $C^t(\cdot)$ for a given symbol $a_j$ may be represented by Equation 8 below.

$$C^t(a_j) = \sum_{k=1}^{j-1} n_k^t \tag{8}$$

At 515, the ANS encoder 505 may update a range associated with normalizing an ANS state X (e.g., an ANS state $X_{t-1}$) based on the range parameter l in accordance with Equation 9 below.

$$\text{range} = \left[ l \cdot F^t(s_{M-t}), 2^b \cdot l \cdot F^t(s_{M-t}) - 1 \right] \tag{9}$$

A lower bound $L_t$ of the range may correspond to the first quantity l. $F^t(s_{M-t})$ of Equation 9, and an upper bound $U_t$ of the range may correspond to the second quantity $2^b \cdot l \cdot F^t(s_{M-t}) - 1$ of Equation 9. For each of the M steps, the ANS encoder 505 may determine the lower bound $L_t$ from the upper bound $U_t$. Accordingly, the ANS encoder 505 may maintain one of the lower bound $L_t$ and the upper bound $U_t$ when implementing ANS algorithms for probabilistic shaping.

At 520, the ANS encoder 505 may stream out bits and normalize an ANS state $X_{t-1}$. In some examples, the ANS encoder 505 may evaluate the ANS state $X_{t-1}$ with respect to the upper bound $U_t$ (e.g., $2^b \cdot l \cdot F^t(s_{M-t}) - 1$). If the ANS encoder 505 determines that the ANS state $X_{t-1}$ falls outside of the upper bound $U_t$ (e.g., $X_{t-1} \geq 2^b \cdot l \cdot F^t(s_{M-t}) - 1$), the ANS encoder 505 may normalize the ANS state $X_{t-1}$. As described herein, the ANS encoder 505 may maintain the upper bound $U_t$.

To normalize the ANS state $X_{t-1}$, the ANS encoder 505 may generate a quantity of bits b to the bit buffer, denoted by $d_0, \ldots, d_{b-1}$. In some examples, to generate the b bits $d_0, \ldots, d_{b-1}$, the ANS encoder 505 may perform a conversion operation on the ANS state $X_{t-1}$. For example, the ANS encoder 505 may convert a decimal value associated with (e.g., communicated by, indicated by) the ANS state $X_{t-1}$ to a binary value indicated by the b bits $d_0, \ldots,$ $d_{b-1}$ in accordance with Equation 10 below.

$$d_0, \ldots, d_{b-1} = DecimaltoBinary\left(\mathrm{mod}\ \left(X_{t-1}, 2^b\right)\right) \qquad (10)$$

For example, after converting the ANS state $X_{t-1}$ from a decimal value to a binary value in accordance with Equation 10, the ANS state $X_{t-1}$ may be represented by a binary vector, which may be a binary representation of an integer value (e.g., the decimal value) of the ANS state $X_{t-1}$. In such cases, the bits $d_0, \ldots, d_{b-1}$ may represent the b least significant bits of the binary representation of the ANS state $X_{t-1}$. After generating the b bits $d_0, \ldots, d_{b-1}$, the ANS encoder 505 may write the b bits $d_0, \ldots, d_{b-1}$ to the bit buffer. After writing the b bits $d_0, \ldots, d_{b-1}$ to the bit buffer, the ANS encoder 505 may update the ANS state $X_{t-1}$. In some examples, the updated ANS state may be the same as the quotient of the ANS state $X_{t-1}$ and $2^b$ (e.g., $X_{t-1}=[X_{t-1}/2^b]$). Additionally, or alternatively, the updated ANS state may represent the most significant bits of the binary representation of the ANS state $X_{t-1}$, which may not include the b least significant bits of the binary representation of the ANS state $X_{t-1}$.

At 525, the ANS encoder 505 may apply the ANS encoding to update the ANS state $X_t$ for a following symbol to be deshaped from the reversed sequence $s_{rev}$. The ANS encoder 505 may update the ANS state $X_t$ for the following symbol to be deshaped from the reversed sequence $s_{rev}$ in accordance with the probability distribution parameters. For example, the ANS encoder 505 may use the quantity of remaining symbols to be deshaped $N_t$, the frequency $F^t$, and the cumulative function $C^t$ $(\cdot)$. In some examples, the ANS encoder 505 may update the ANS state $X_t$ in accordance with Equation 11 below.

$$X_t = \left\lfloor \frac{X_{t-1}}{F^t(s_{M-t})} \right\rfloor \cdot N^t + C^t(s_{M-t}) + \mathrm{mod}\ (X_{t-1}, F^t(s_{M-t})) \qquad (6)$$

In some other examples, the ANS encoder 505 may implement ANS algorithms for probabilistic shaping in hardware using binary arithmetic, where the hardware of the ANS encoder 505 may only recognize bits. In some cases where the ANS state $X_{t-1}$ is represented by the b least significant bits of the binary representation of the ANS state $X_{t-1}$, the ANS encoder 505 may update the ANS state $X_t$ using a bit shift operation. That is, the ANS encoder 505 may refrain from updating ANS state $X_t$ in accordance with Equation 11 (e.g., may refrain from performing modulo operations).

The ANS encoder 505 may use the updated ANS state $X_t$ to deshape a next symbol in the sequence of shaped symbols. For example, the ANS encoder 505 may use the updated ANS state $X_t$ to determine one or more probability distribution parameters for a following arbitrary step t+1 of the set of steps $\{1, 2, \ldots, M\}$. After the ANS encoder 505 performs the M steps to process all of the symbols of the sequence s (e.g., all of the symbols of the reversed sequence $s_{rev}$), the ANS encoder 505 may receive a final deshaped information vector. For example, the ANS encoder 505 may receive the bit buffer (e.g., the b bits written to the bit buffer at each step M) and may receive an ANS state variable $X_M$ that represents the ANS state at the final step M. In some examples, the length of the bit buffer may vary (e.g., for different sequences s), but the total length of the bit buffer may be less than K. Additionally, or alternatively, the ANS state variable $X_M$ may be less than $2^b \cdot 1 \cdot M$.

The ANS encoder 505 may repeat the steps 510 through 525 of the operational flow 500 a quantity M times until all of the shaped symbols (e.g., corresponding to the quantity of symbols to be shaped M) have been deshaped. That is, the ANS encoder 505 may repeat the steps 510 through 525 of the operational flow 500 a quantity M times to obtain and deshape the sequence of shaped symbols. After obtaining and deshaping the sequence of shaped symbols, the ANS encoder 505 may process the bit buffer and the ANS state variable $X_M$ to obtain the final deshaped information vector.

In some examples, the ANS encoder 505 may calculate a binary expansion of the ANS state variable $X_M$ and may concatenate the calculated binary expansion to the bit buffer (e.g., the b bits written to the bit buffer at each step M) to obtain the final deshaped information vector. In such examples, the ANS encoder 505 may use a function (e.g., a DecimaltoBinary function) to convert a decimal value indicated by the ANS state variable $X_M$ to a binary value indicated by one or more bits. Such a DecimaltoBinary function may indicate most significant bits of the converted ANS state variable $X_M$ in higher bit indices. That is, the DecimaltoBinary function may position or shift the most significant bits of the converted ANS state variable $X_M$ to the right (e.g., to a rightmost end) of the one or more bits. Similarly, the DecimaltoBinary function may position or shift least significant bits of the converted ANS state variable $X_M$ to the left (e.g., to a leftmost end) of the one or more bits. For example, the DecimaltoBinary function may convert a decimal value of 6 to a binary bit sequence 011. Additionally, in some cases where the total number of bits of the final deshaped information vector is less than K, the ANS encoder 505 may pad (e.g., add) zeroes (e.g., bits indicating a value of zero) to the end of the final deshaped information vector until the total number of bits of the final deshaped information vector is equal to K.

By obtaining the final deshaped information vector, the ANS encoder 505 may recover information bits shaped from the received sequence of shaped symbols. In some examples, the bits of the final deshaped information vector may correspond to a sequence of data bits that were provided to the ANS decoder to be shaped, which may be denoted by the sequence $b_0, \ldots, b_{k-1}$ as described with reference to FIG. 4.

Figure 6:
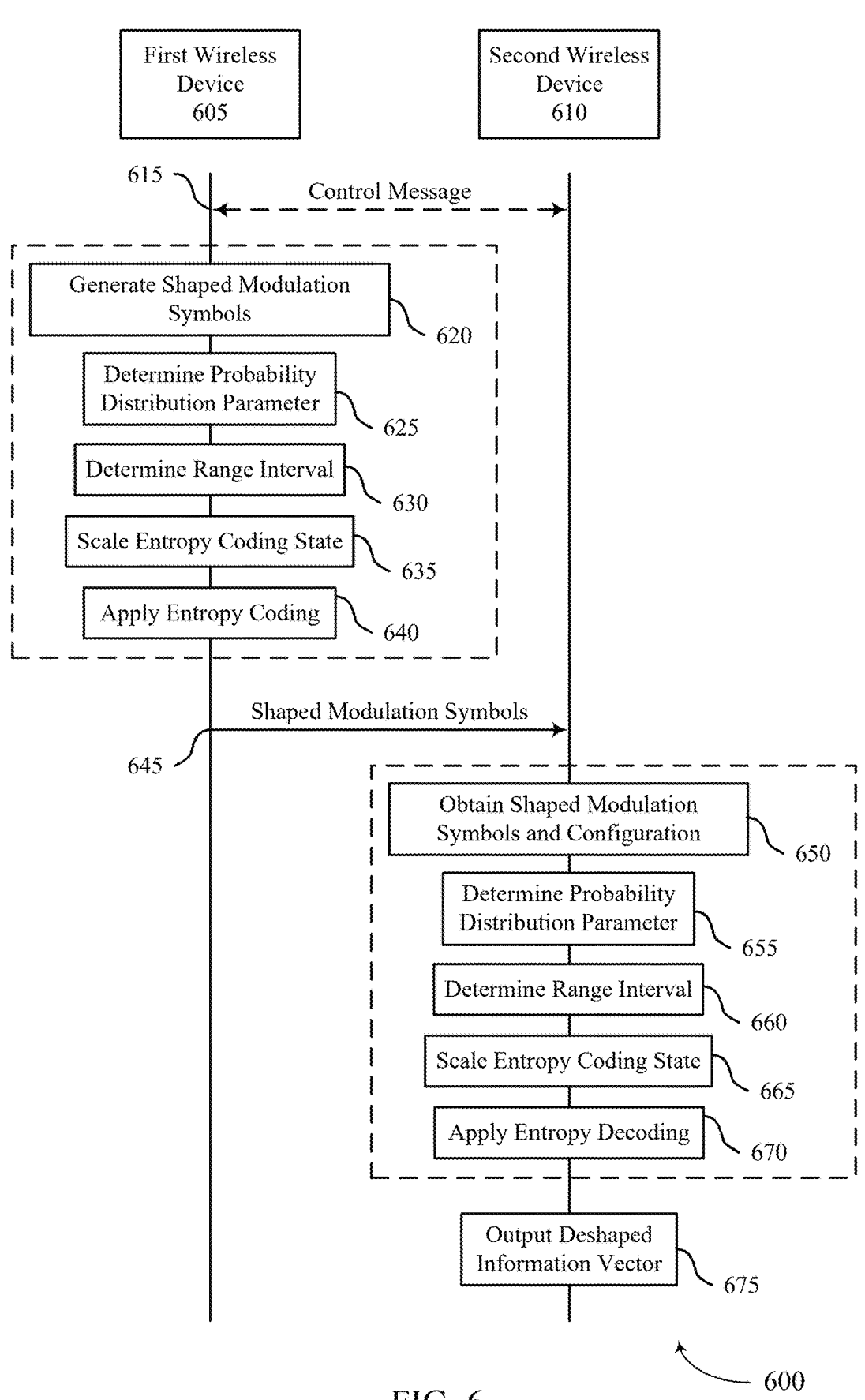
FIG. 6 shows an example of a process flow that supports streaming and normalization for asymmetric numeral system-based probabilistic shaping in accordance with one or more aspects of the present disclosure.

FIG. 6 shows an example of a process flow 600 that supports streaming and normalization for asymmetric numeral system-based probabilistic shaping in accordance with one or more aspects of the present disclosure. The process flow 600 may implement or be implemented by aspects of the wireless communications system 100, the wireless communications system 200, the signaling diagram 300, the operational flow 400, or the operational flow 500 as described with reference to FIGS. 1-5. For example, the process flow 600 may illustrate actions performed by a first wireless device 605 and a second wireless device 610, which may be examples of corresponding devices as described herein, including with reference to FIGS. 1-5. In the following description of the process flow 600, the operations between the first wireless device 605 and the second wireless device 610 may be performed in a different order than the example shown, or the operations between the first wireless device 605 and the second wireless device 610 may be performed in different orders at different times. Some operations may also be omitted from the process flow 600, and other operations may be added to the process flow 600.

At 615, the first wireless device 605 may communicate a control message indicating a configuration for entropy coding-based probabilistic shaping of data. The entropy coding-based probabilistic shaping of data may include ANS entropy coding. In some examples, the first wireless device 605 may communicate (e.g., transmit, receive) the control message with the second wireless device 610. In some examples, the configuration may indicate a range parameter, a bitwidth parameter, and a quantity of symbols to be shaped. In such examples, the range parameter, the bitwidth parameter, a quantity of bits for initializing the entropy coding state, or any combination thereof, may be determined (e.g., by the first wireless device 605, by the second wireless device 610) based on a QAM order, a quantity of shaped symbols per shaping block, a shaping distribution, or any combination thereof. The quantity of bits for initializing the entropy coding state may be an integer quantity associated with an upper limit. The bitwidth parameter may be divisible by the integer quantity of bits. The range parameter may be a power of 2.

At 620, the first wireless device 605 may generate a plurality of shaped modulation symbols based on the configuration for the entropy coding-based probabilistic shaping of data, the configuration indicating the range parameter, the bitwidth parameter, and the quantity of symbols to be shaped. To generate each shaped modulation symbol of the plurality of shaped modulation symbols, the first wireless device 605 may perform the operations described from 625 to 640. In some examples, the first wireless device 605 may perform the operations described from 625 to 640 multiple times corresponding to the quantity of symbols to be shaped.

At 625, the first wireless device 605 may determine a probability distribution parameter associated with a shaped modulation symbol (e.g., with each shaped modulation symbol) of the plurality of shaped modulation symbols based on a target shaping distribution for the plurality of shaped modulation symbols. In some examples, the first wireless device 605 may determine the probability distribution parameter based on the quantity of remaining symbols, a frequency associated with remaining symbols to be generated of the quantity of remaining symbols, and a cumulative function. Additionally, or alternatively, the probability distribution parameter may be based on one or more previously generated shaped modulation symbols of the plurality of shaped modulation symbols.

At 630, the first wireless device 605 may determine a range interval associated with the shaped modulation symbol based on the range parameter, a quantity of remaining symbols to generate of the plurality of shaped modulation symbols, and the bitwidth parameter. The first wireless device 605 may determine a lower boundary of the range interval based on a quantity of remaining symbols to be generated of the plurality of shaped modulation symbols and the range parameter.

At 635, the first wireless device 605 may scale an entropy coding state associated with the shaped modulation symbol and the entropy coding-based probabilistic shaping to obtain a scaled entropy coding state that occurs within the range interval. In some examples, the entropy coding state may be scaled to occur within the range interval. To scale the entropy coding state, the first wireless device may read a quantity of bits from a bit buffer that stores bits associated with the entropy coding state, remove the quantity of bits from the bit buffer after reading the quantity of bits from the bit buffer, and update, after removing the quantity of bits from the bit buffer, the entropy coding state based on the quantity of bits read from the bit buffer. In such examples, the quantity of bits may be based on the bitwidth parameter. Additionally, the removed quantity of bits may occupy an end set of bits of the bit buffer.

At 640, the first wireless device 605 may apply entropy coding, based at on the probability distribution parameter, to the scaled entropy coding state to generate the shaped modulation symbol of the plurality of shaped modulation symbols. In some examples, applying entropy encoding may include updating the entropy coding state. To update the entropy coding state, the first wireless device 605 may convert a binary value obtained from the quantity of bits read from the bit buffer to a decimal value, scale the entropy coding state in accordance with the bitwidth parameter, and add the decimal value to the scaled entropy coding state. The updated entropy coding state may be based on a summation of the decimal value and the scaled entropy coding state.

At 645, the first wireless device 605 may transmit the plurality of shaped modulation symbols. In some examples, the first wireless device 605 may transmit a sequence of shaped modulation symbols to the second wireless device 610.

At 650, the second wireless device 610 may obtain a plurality of shaped modulation symbols and the configuration for entropy coding-based probabilistic shaping of data, the configuration indicating the range parameter, the bitwidth parameter, and the quantity of symbols to be shaped. In some examples, the second wireless device 610 may receive the sequence of shaped modulation symbols from the first wireless device 605. Additionally, or alternatively, the second wireless device 610 may receive the configuration via the control message communicated between the first wireless device 605 and the second wireless device 610. The second wireless device 610 may reverse an order of the plurality of shaped modulation symbols relative to an initial order of receipt of the plurality of shaped modulation symbols.

To obtain each shaped modulation symbol of the plurality of shaped modulation symbols, the second wireless device 610 may perform the operations described from 655 to 670. In some examples, the second wireless device 610 may perform the operations described from 655 to 670 multiple times corresponding to the quantity of symbols to be shaped.

At 655, the second wireless device 610 may determine a probability distribution parameter associated with a shaped modulation symbol (e.g., with each shaped modulation symbol) of the plurality of shaped modulation symbols based on a subset of the plurality of shaped modulation symbols. In some examples, the second wireless device 610 may determine the probability distribution parameter based on a quantity of shaped modulation symbols, the frequency associated with the quantity of shaped modulation symbols, and a cumulative function.

At 660, the second wireless device 610 may determine a range interval associated with the shaped modulation symbol based on the range parameter, the frequency associated with the subset of the plurality of shaped modulation symbols, and the bitwidth parameter. In some examples, an upper boundary of the range interval is based on the frequency associated with the subset of the plurality of shaped modulation symbols and the range parameter.

At 665, the second wireless device 610 may scaling an entropy coding state associated with the shaped modulation symbol and the entropy coding-based probabilistic shaping to obtain a scaled entropy coding state that occurs within the range interval. In some examples, the entropy coding state may be scaled to occur within the range interval. To scale the entropy coding state, the second wireless device 610 may generate a quantity of bits based on converting a decimal value associated with the entropy coding state to a binary value, and divide the entropy coding state in accordance with the bitwidth parameter to obtain an intermediate entropy coding state or the scaled entropy coding state. In such examples, the quantity of bits may be based on the bitwidth parameter. The decimal value associated with the entropy coding state may be a remainder of dividing the entropy coding state by a power of 2 scaled by the bitwidth parameter.

At 670, the second wireless device 610 may apply entropy decoding, based on the probability distribution parameter and the scaled entropy coding state, to update an entropy coding state associated with a second shaped modulation symbol.

At 675, the second wireless device 610 may output a deshaped information vector based on the plurality of shaped modulation symbols. In some examples, to obtain the deshaped information vector, the second wireless device 610 may determine a binary expansion of a final entropy coding state, and concatenate the binary expansion of the final entropy coding state to a plurality of bits included in a bit buffer associated with the second wireless device. The bit buffer associated with the second wireless device is initialized as an empty buffer. Additionally, or alternatively, to obtain the deshaped information vector, the second wireless device 610 may add one or more padding bits to the deshaped information vector until a total quantity of bits of the deshaped information vector corresponds to (e.g., is equal to) a quantity of bits for initializing the entropy coding state.

Figure 7:
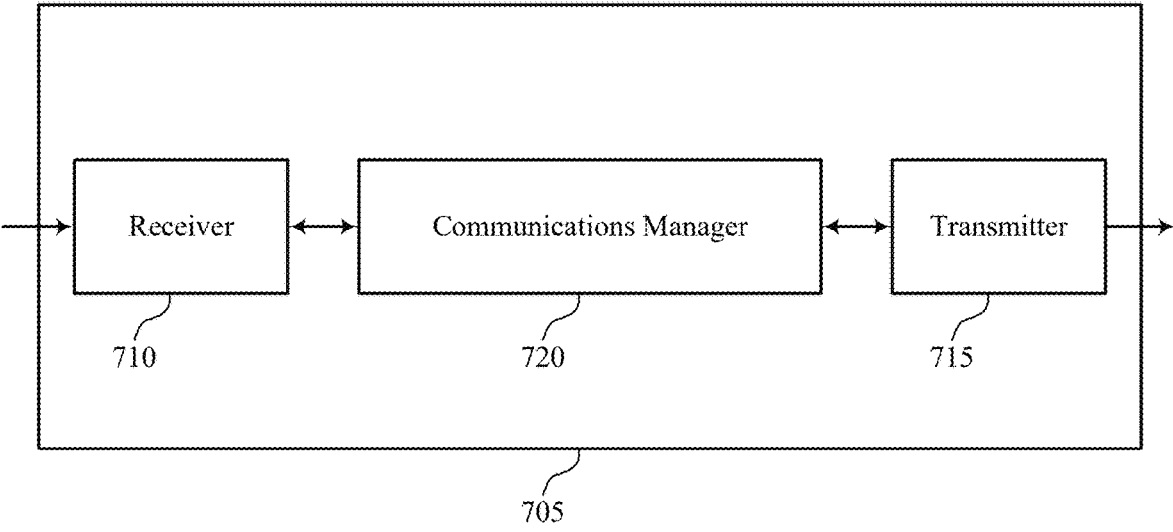
FIGS. 7 and 8 show block diagrams of devices that support streaming and normalization for asymmetric numeral system-based probabilistic shaping in accordance with one or more aspects of the present disclosure.

FIG. 7 shows a block diagram 700 of a device 705 that supports streaming and normalization for asymmetric numeral system-based probabilistic shaping in accordance with one or more aspects of the present disclosure. The device 705 may be an example of aspects of a first wireless device as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to streaming and normalization for asymmetric numeral system-based probabilistic shaping). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to streaming and normalization for asymmetric numeral system-based probabilistic shaping). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of streaming and normalization for asymmetric numeral system-based probabilistic shaping as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for generating a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols. The communications manager 720 is capable of, configured to, or operable to support a means for transmitting the set of multiple shaped modulation symbols.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing.

Figure 8:
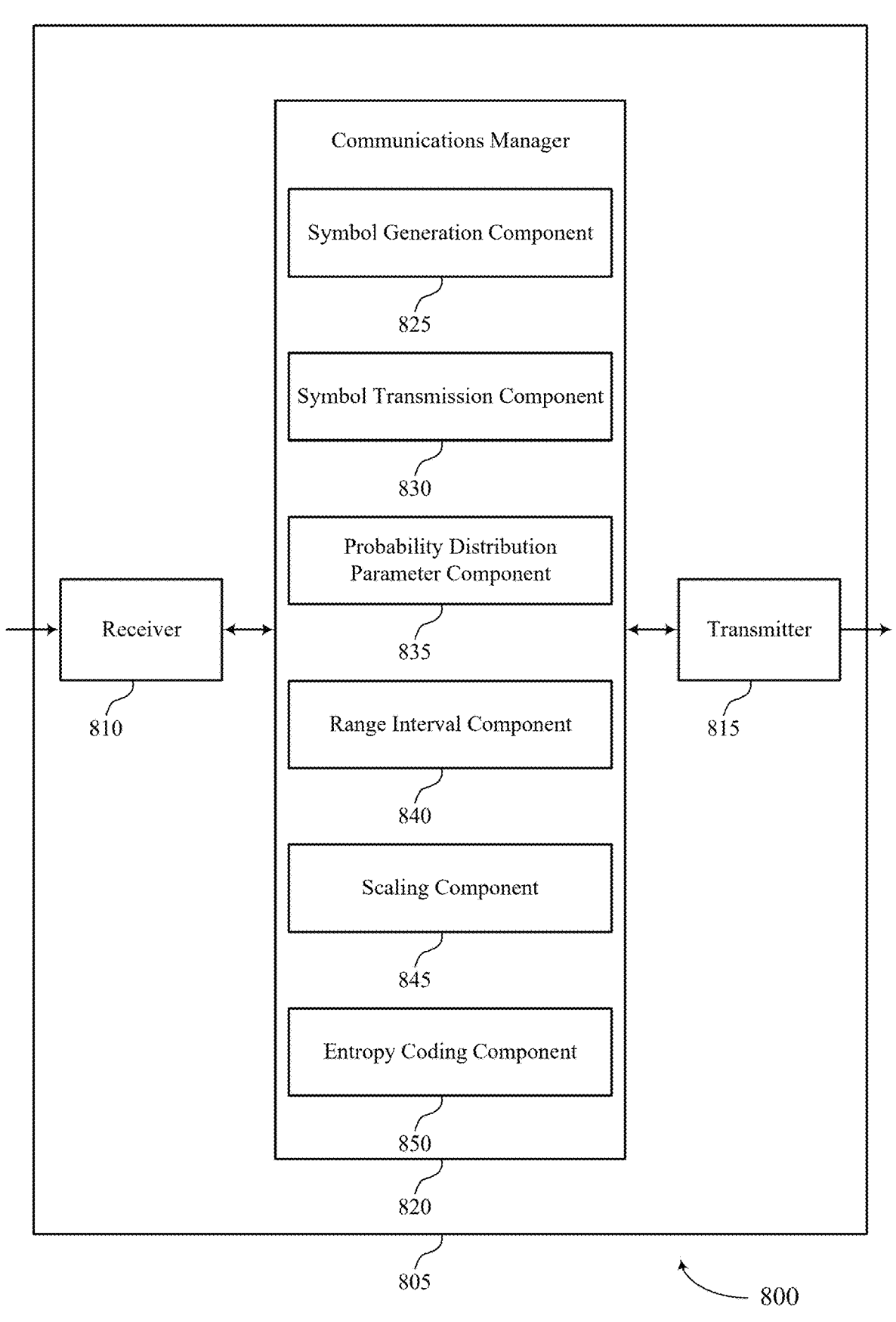

FIG. 8 shows a block diagram 800 of a device 805 that supports streaming and normalization for asymmetric numeral system-based probabilistic shaping in accordance with one or more aspects of the present disclosure. The device 805 may be an example of aspects of a device 705, a first wireless device 205-a, or an ANS decoder 405 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to streaming and normalization for asymmetric numeral system-based probabilistic shaping). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to streaming and normalization for asymmetric numeral system-based probabilistic shaping). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of streaming and normalization for asymmetric numeral system-based probabilistic shaping as described herein. For example, the communications manager 820 may include a symbol generation component 825 a symbol transmission component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The symbol generation component 825 is capable of, configured to, or operable to support a means for generating a set of multiple shaped modulation symbols based on a configuration for entropy coding-based probabilistic shaping of data, the configuration indicating a range parameter, a bitwidth parameter, and a quantity of symbols to be shaped. In some examples, to, the probability distribution parameter component 835 may be configured as or otherwise support a means for determining a probability distribution parameter associated with a shaped modulation symbol of the set of multiple shaped modulation symbols based on a target shaping distribution for the set of multiple shaped modulation symbols, the range interval component 840 may be configured as or otherwise support a means for determining a range interval associated with the shaped modulation symbol based on the range parameter, a quantity of remaining symbols to generate of the set of multiple shaped modulation symbols, and the bitwidth parameter, the scaling component 845 may be configured as or otherwise support a means for scaling an entropy coding state associated with the shaped modulation symbol and the entropy coding-based probabilistic shaping to obtain a scaled entropy coding state that occurs within the range interval, and the entropy coding component 850 may be configured as or otherwise support a means for applying entropy coding, based on the probability distribution parameter, to the scaled entropy coding state to generate the shaped modulation symbol of the set of multiple shaped modulation symbols. The symbol transmission component 830 is capable of, configured to, or operable to support a means for transmitting the set of multiple shaped modulation symbols.

Figure 9:
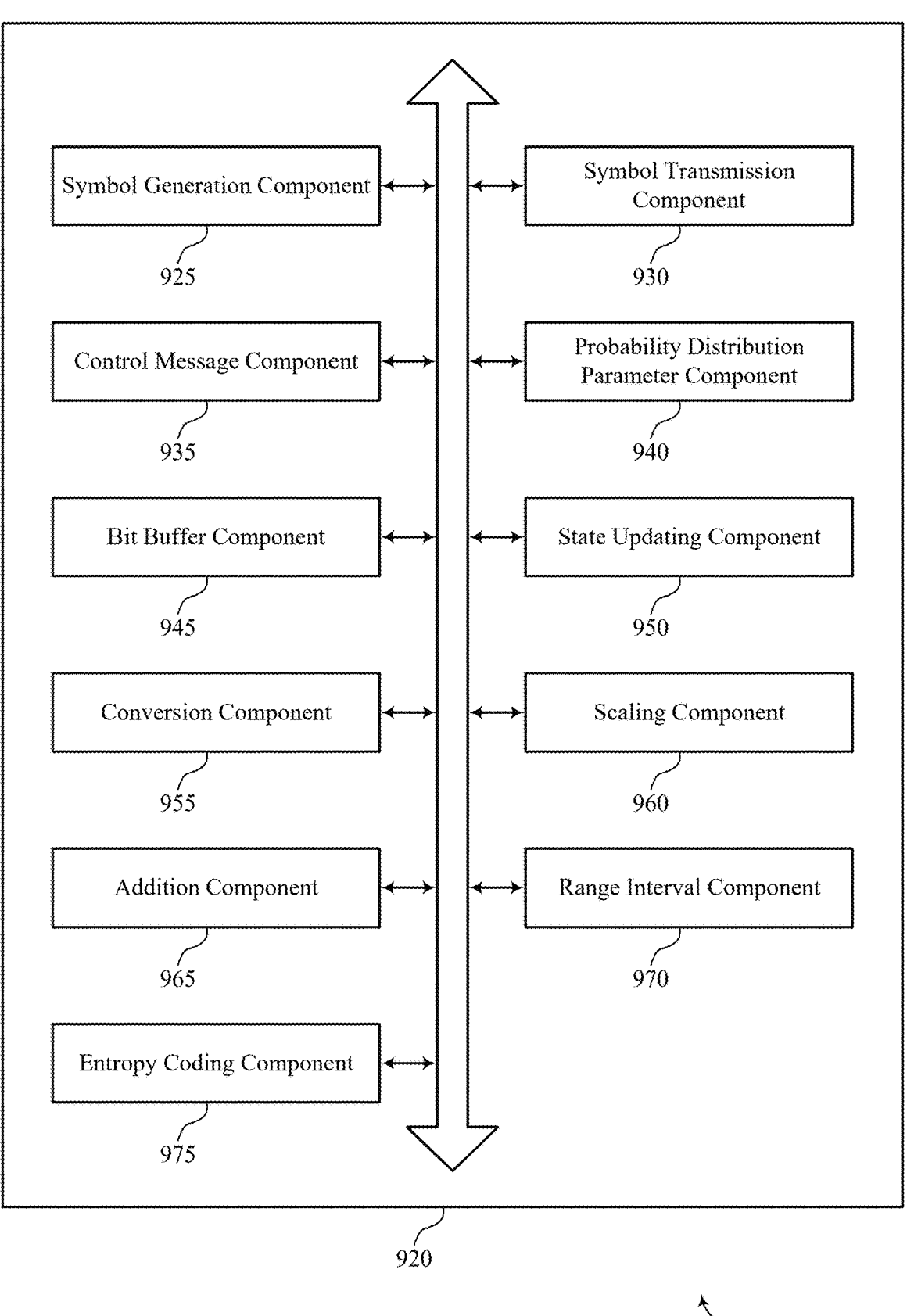
FIG. 9 shows a block diagram of a communications manager that supports streaming and normalization for asymmetric numeral system-based probabilistic shaping in accordance with one or more aspects of the present disclosure.

FIG. 9 shows a block diagram 900 of a communications manager 920 that supports streaming and normalization for asymmetric numeral system-based probabilistic shaping in accordance with one or more aspects of the present disclosure. The communications manager 920 may be an example of aspects of a communications manager 720, a communications manager 820, or both, as described herein. The communications manager 920, or various components thereof, may be an example of means for performing various aspects of streaming and normalization for asymmetric numeral system-based probabilistic shaping as described herein. For example, the communications manager 920 may include a symbol generation component 925, a symbol transmission component 930, a control message component 935, a probability distribution parameter component 940, a bit buffer component 945, a state updating component 950, a conversion component 955, a scaling component 960, an addition component 965, a range interval component 970, an entropy coding component 975, or any combination thereof. Each of these components, or components or subcomponents thereof (e.g., one or more processors, one or more memories), may communicate, directly or indirectly, with one another (e.g., via one or more buses).

The communications manager 920 may support wireless communications in accordance with examples as disclosed herein. The symbol generation component 925 is capable of, configured to, or operable to support a means for generating a set of multiple shaped modulation symbols based on a configuration for entropy coding-based probabilistic shaping of data, the configuration indicating a range parameter, a bitwidth parameter, and a quantity of symbols to be shaped. In some examples the probability distribution parameter component 940 is capable of, configured to, or operable to support a means for determining a probability distribution parameter associated with a shaped modulation symbol of the set of multiple shaped modulation symbols based on a target shaping distribution for the set of multiple shaped modulation symbols, the range interval component 970 is capable of, configured to, or operable to support a means for determining a range interval associated with the shaped modulation symbol based on the range parameter, a quantity of remaining symbols to generate of the set of multiple shaped modulation symbols, and the bitwidth parameter, the scaling component 960 is capable of, configured to, or operable to support a means for scaling an entropy coding state associated with the shaped modulation symbol and the entropy coding-based probabilistic shaping to obtain a scaled entropy coding state that occurs within the range interval, and the entropy coding component 975 is capable of, configured to, or operable to support a means for applying entropy coding, based on the probability distribution parameter, to the scaled entropy coding state to generate the shaped modulation symbol of the set of multiple shaped modulation symbols. The symbol transmission component 930 is capable of, configured to, or operable to support a means for transmitting the set of multiple shaped modulation symbols.

In some examples, the control message component 935 is capable of, configured to, or operable to support a means for communicating a control message indicating the configuration for the entropy coding-based probabilistic shaping of data.

In some examples, the range parameter, the bitwidth parameter, a quantity of bits for initializing the entropy coding state, or any combination thereof, are determined based on a quadrature amplitude modulation (QAM) order, a quantity of shaped symbols per shaping block, a shaping distribution, or any combination thereof.

In some examples, the quantity of bits for initializing the entropy coding state is an integer quantity associated with an upper limit; and the bitwidth parameter is divisible by the integer quantity of bits.

In some examples, the range parameter is a power of 2.

In some examples, to support determining the probability distribution parameter, the probability distribution parameter component 940 is capable of, configured to, or operable to support a means for determining the probability distribution parameter based on the quantity of remaining symbols, a frequency associated with remaining symbols to be generated of the quantity of remaining symbols, and a cumulative function.

In some examples, the probability distribution parameter is based on one or more previously generated shaped modulation symbols of the set of multiple shaped modulation symbols.

In some examples, a lower boundary of the range interval is based on a quantity of remaining symbols to be generated of the set of multiple shaped modulation symbols and the range parameter.

In some examples, the entropy coding state is scaled to occur within the range interval.

In some examples, to support scaling the entropy coding state, the bit buffer component 945 is capable of, configured to, or operable to support a means for reading a quantity of bits from a bit buffer that stores bits associated with the entropy coding state, the quantity of bits based on the bitwidth parameter. In some examples, to support scaling the entropy coding state, the bit buffer component 945 is capable of, configured to, or operable to support a means for removing the quantity of bits from the bit buffer after reading the quantity of bits from the bit buffer. In some examples, to support scaling the entropy coding state, the state updating component 950 is capable of, configured to, or operable to support a means for updating, after removing the quantity of bits from the bit buffer, the entropy coding state based on the quantity of bits read from the bit buffer.

In some examples, to support updating the entropy coding state, the conversion component 955 is capable of, configured to, or operable to support a means for converting a binary value obtained from the quantity of bits read from the bit buffer to a decimal value. In some examples, to support updating the entropy coding state, the scaling component 960 is capable of, configured to, or operable to support a means for scaling the entropy coding state in accordance with the bitwidth parameter. In some examples, to support updating the entropy coding state, the addition component 965 is capable of, configured to, or operable to support a means for adding the decimal value to the scaled entropy coding state, where the updated entropy coding state is based on a summation of the decimal value and the scaled entropy coding state.

In some examples, the removed quantity of bits occupy an end set of bits of the bit buffer.

In some examples, the entropy coding-based probabilistic shaping of data includes asymmetric numerical system (ANS) entropy coding.

Figure 10:
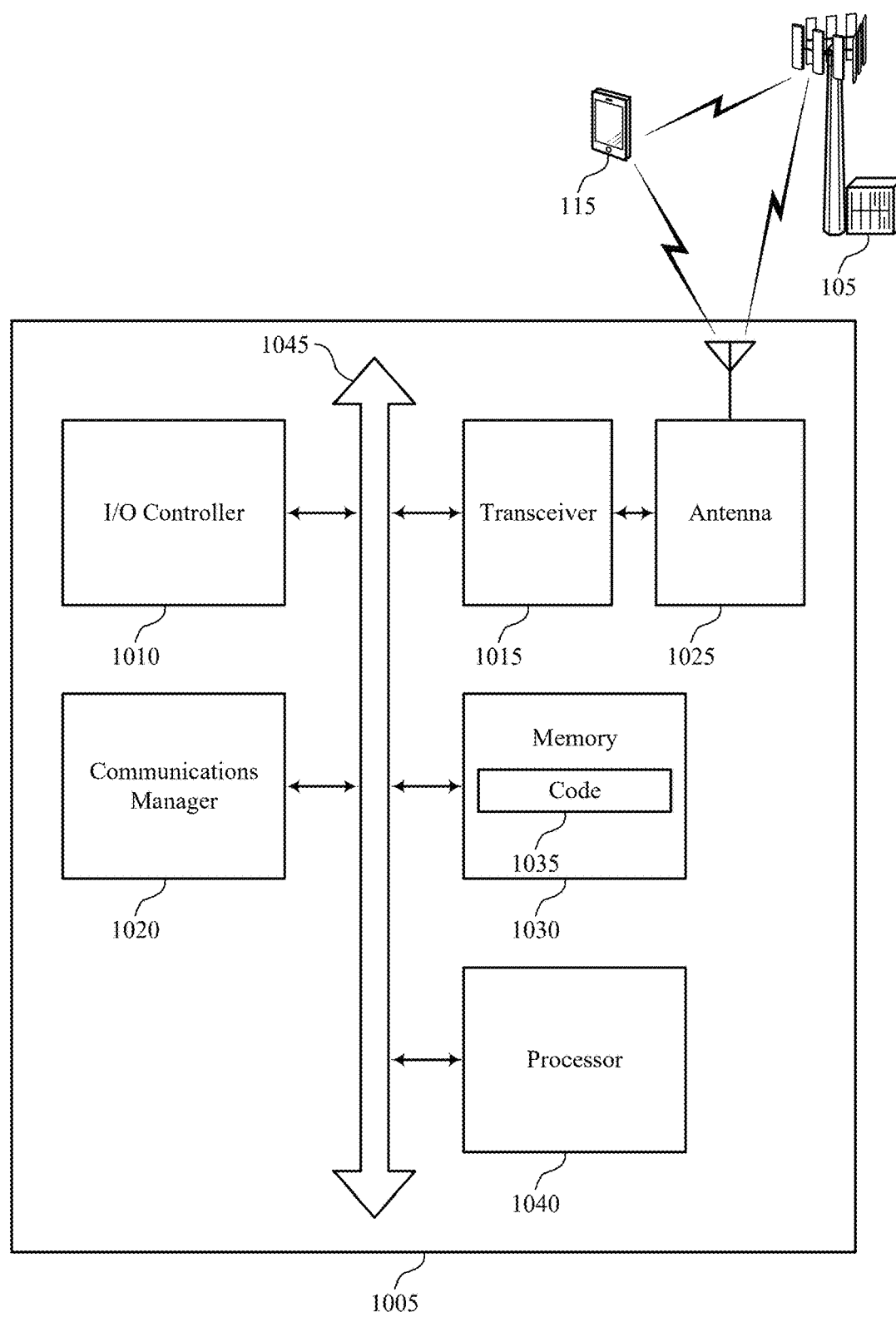
FIG. 10 shows a diagram of a system including a device that supports streaming and normalization for asymmetric numeral system-based probabilistic shaping in accordance with one or more aspects of the present disclosure.

FIG. 10 shows a diagram of a system 1000 including a device 1005 that supports streaming and normalization for asymmetric numeral system-based probabilistic shaping in accordance with one or more aspects of the present disclosure. The device 1005 may be an example of or include components of a device 705, a device 805, or a first wireless device as described herein. The device 1005 may include components for bi-directional voice and data communications including components for transmitting and receiving communications, such as a communications manager 1020, an I/O controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include RAM and ROM. The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a BIOS which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting streaming and normalization for asymmetric numeral system-based probabilistic shaping). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communications in accordance with examples as disclosed herein. For example, the communications manager 1020 is capable of, configured to, or operable to support a means for generating a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols. The communications manager 1020 is capable of, configured to, or operable to support a means for transmitting the set of multiple shaped modulation symbols.

By including or configuring the communications manager 1020 in accordance with examples as described herein, the device 1005 may support techniques for reduced latency and improved user experience related to reduced processing.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of streaming and normalization for asymmetric numeral system-based probabilistic shaping as described herein, or the at least one processor 1040 and the at least one memory 1030 may be otherwise configured to, individually or collectively, perform or support such operations.

Figure 11:
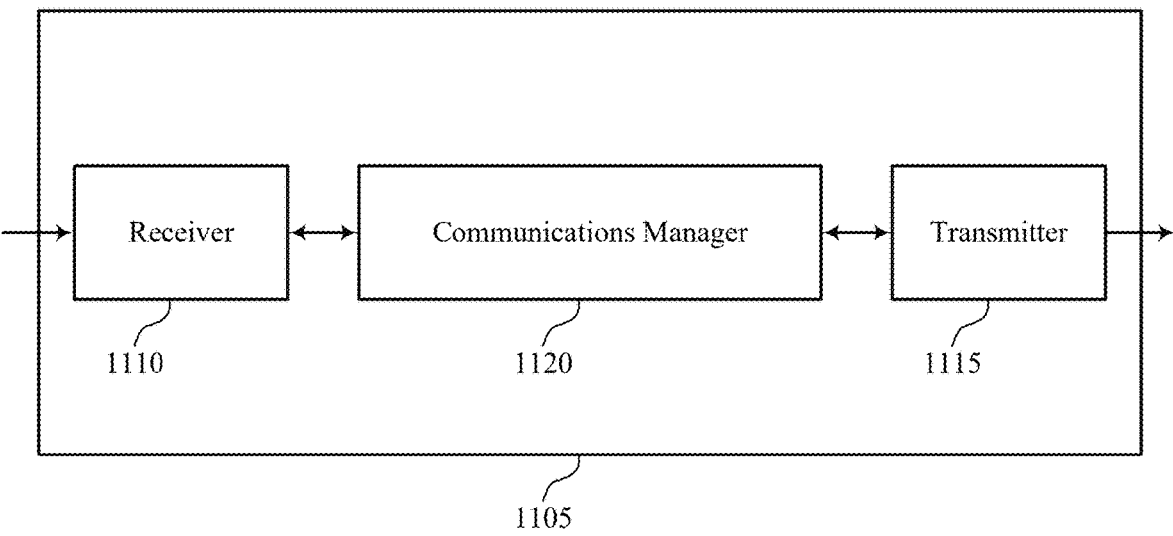
FIGS. 11 and 12 show block diagrams of devices that support streaming and normalization for asymmetric numeral system-based probabilistic shaping in accordance with one or more aspects of the present disclosure.

FIG. 11 shows a block diagram 1100 of a device 1105 that supports streaming and normalization for asymmetric numeral system-based probabilistic shaping in accordance with one or more aspects of the present disclosure. The device 1105 may be an example of aspects of a second wireless device as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations or components thereof may be examples of means for performing various aspects of streaming and normalization for asymmetric numeral system-based probabilistic shaping as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for obtaining a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol. The communications manager 1120 is capable of, configured to, or operable to support a means for outputting a deshaped information vector based on the set of multiple shaped modulation symbols.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced processing.

Figure 12:
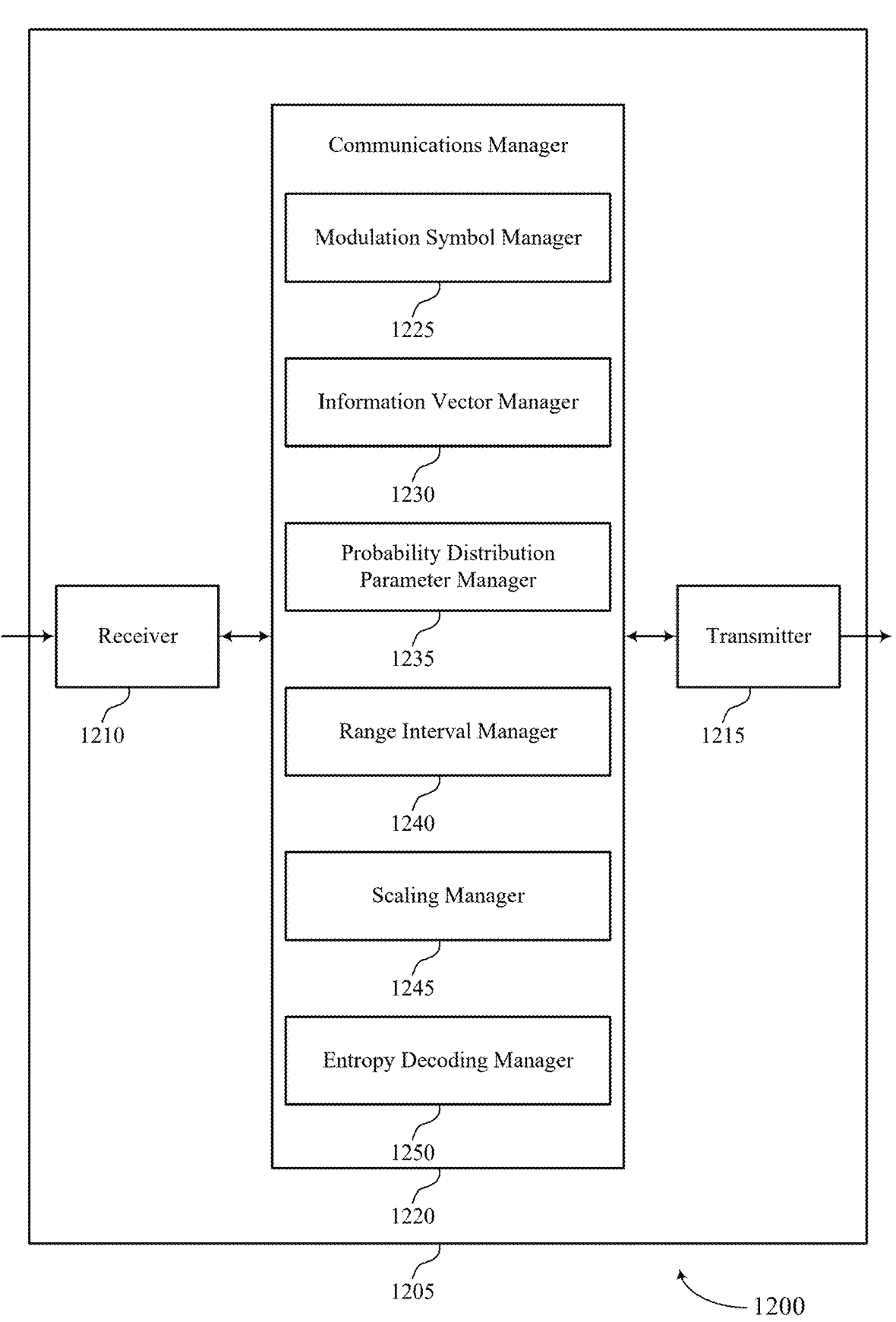

FIG. 12 shows a block diagram 1200 of a device 1205 that supports streaming and normalization for asymmetric numeral system-based probabilistic shaping in accordance with one or more aspects of the present disclosure. The device 1205 may be an example of aspects of a device 1105, a second wireless device 205-b, or an ANS encoder 505 as described herein as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of streaming and normalization for asymmetric numeral system-based probabilistic shaping as described herein. For example, the communications manager 1220 may include a modulation symbol manager 1225 an information vector manager 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The modulation symbol manager 1225 is capable of, configured to, or operable to support a means for obtaining a set of multiple shaped modulation symbols and a configuration for entropy coding-based probabilistic shaping of data, the configuration indicating a range parameter, a bitwidth parameter, and a quantity of symbols to be shaped. In some examples, to, the probability distribution parameter manager 1235 may be configured as or otherwise support a means for determining a probability distribution parameter associated with a shaped modulation symbol of the set of multiple shaped modulation symbols based on a subset of the set of multiple shaped modulation symbols, the range interval manager 1240 may be configured as or otherwise support a means for determining a range interval associated with the shaped modulation symbol based on the range parameter, a frequency associated with the subset of the set of multiple shaped modulation symbols, and the bitwidth parameter, the scaling manager 1245 may be configured as or otherwise support a means for scaling an entropy coding state associated with the shaped modulation symbol and the entropy coding-based probabilistic shaping to obtain a scaled entropy coding state that occurs within the range interval, and the entropy decoding manager 1250 may be configured as or otherwise support a means for applying entropy decoding, based on the probability distribution parameter and the scaled entropy coding state, to update an entropy coding state associated with a second shaped modulation symbol. The information vector manager 1230 is capable of, configured to, or operable to support a means for outputting a deshaped information vector based on the set of multiple shaped modulation symbols.

Figure 13:
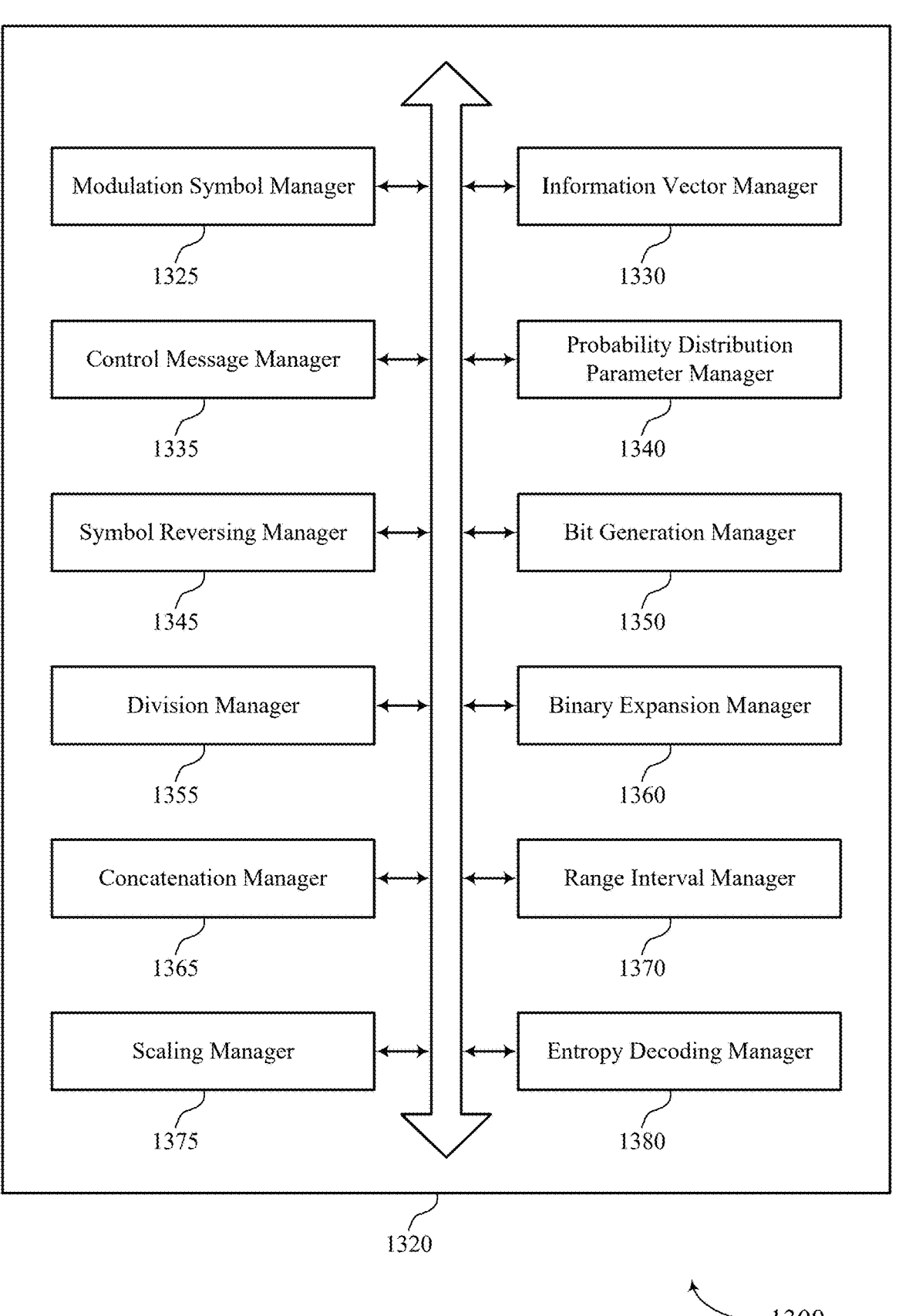
FIG. 13 shows a block diagram of a communications manager that supports streaming and normalization for asymmetric numeral system-based probabilistic shaping in accordance with one or more aspects of the present disclosure.

FIG. 13 shows a block diagram 1300 of a communications manager 1320 that supports streaming and normalization for asymmetric numeral system-based probabilistic shaping in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of streaming and normalization for asymmetric numeral system-based probabilistic shaping as described herein. For example, the communications manager 1320 may include a modulation symbol manager 1325, an information vector manager 1330, a control message manager 1335, a probability distribution parameter manager 1340, a symbol reversing manager 1345, a bit generation manager 1350, a division manager 1355, a binary expansion manager 1360, a concatenation manager 1365, a range interval manager 1370, a scaling manager 1375, an entropy decoding manager 1380, or any combination thereof. Each of these components, or components or subcomponents thereof (e.g., one or more processors, one or more memories), may communicate, directly or indirectly, with one another (e.g., via one or more buses).

The communications manager 1320 may support wireless communications in accordance with examples as disclosed herein. The modulation symbol manager 1325 is capable of, configured to, or operable to support a means for obtaining a set of multiple shaped modulation symbols and a configuration for entropy coding-based probabilistic shaping of data, the configuration indicating a range parameter, a bitwidth parameter, and a quantity of symbols to be shaped. In some examples, the probability distribution parameter manager 1340 is capable of, configured to, or operable to support a means for determining a probability distribution parameter associated with a shaped modulation symbol of the set of multiple shaped modulation symbols based on a subset of the set of multiple shaped modulation symbols, the range interval manager 1370 is capable of, configured to, or operable to support a means for determining a range interval associated with the shaped modulation symbol based on the range parameter, a frequency associated with the subset of the set of multiple shaped modulation symbols, and the bitwidth parameter, the scaling manager 1375 is capable of, configured to, or operable to support a means for scaling an entropy coding state associated with the shaped modulation symbol and the entropy coding-based probabilistic shaping to obtain a scaled entropy coding state that occurs within the range interval, and the entropy decoding manager 1380 is capable of, configured to, or operable to support a means for applying entropy decoding, based on the probability distribution parameter and the scaled entropy coding state, to update an entropy coding state associated with a second shaped modulation symbol. The information vector manager 1330 is capable of, configured to, or operable to support a means for outputting a deshaped information vector based on the set of multiple shaped modulation symbols.

In some examples, the control message manager 1335 is capable of, configured to, or operable to support a means for communicating a control message indicating the configuration for the entropy coding-based probabilistic shaping of data.

In some examples, the range parameter, the bitwidth parameter, a quantity of bits for initializing the entropy coding state, or any combination thereof, are determined based on a quadrature amplitude modulation (QAM) order, a quantity of shaped symbols per shaping block, a shaping distribution, or any combination thereof.

In some examples, the quantity of bits for initializing the entropy coding state is an integer quantity associated with an upper limit; and the bitwidth parameter is divisible by the integer quantity of bits.

In some examples, the range parameter is a power of 2.

In some examples, to support determining the probability distribution parameter, the probability distribution parameter manager 1340 is capable of, configured to, or operable to support a means for determining the probability distribution parameter based on a quantity of shaped modulation symbols, the frequency associated with the quantity of shaped modulation symbols, and a cumulative function.

In some examples, the symbol reversing manager 1345 is capable of, configured to, or operable to support a means for reversing an order of the set of multiple shaped modulation symbols relative to an initial order of receipt of the set of multiple shaped modulation symbols.

In some examples, the information vector manager 1330 is capable of, configured to, or operable to support a means for adding one or more padding bits to the deshaped information vector until a total quantity of bits of the deshaped information vector corresponds to a quantity of bits for initializing the entropy coding state.

In some examples, a bit buffer associated with the second wireless device is initialized as an empty buffer.

In some examples, an upper boundary of the range interval is based on the frequency associated with the subset of the set of multiple shaped modulation symbols and the range parameter.

In some examples, the entropy coding state is scaled to occur within the range interval.

In some examples, to support scaling the entropy coding state, the bit generation manager 1350 is capable of, configured to, or operable to support a means for generating a quantity of bits based on converting a decimal value associated with the entropy coding state to a binary value, the quantity of bits based on the bitwidth parameter. In some examples, to support scaling the entropy coding state, the division manager 1355 is capable of, configured to, or operable to support a means for dividing the entropy coding state in accordance with the bitwidth parameter to obtain an intermediate entropy coding state or the scaled entropy coding state.

In some examples, the decimal value associated with the entropy coding state is a remainder of dividing the entropy coding state by a power of 2 scaled by the bitwidth parameter.

In some examples, to support obtaining the deshaped information vector, the binary expansion manager 1360 is capable of, configured to, or operable to support a means for determining a binary expansion of a final entropy coding state. In some examples, to support obtaining the deshaped information vector, the concatenation manager 1365 is capable of, configured to, or operable to support a means for concatenating the binary expansion of the final entropy coding state to a set of multiple bits included in a bit buffer associated with the second wireless device to obtain the deshaped information vector.

In some examples, the entropy coding-based probabilistic shaping of data includes asymmetric numerical system (ANS) entropy coding.

Figure 14:
FIG. 14 shows a diagram of a system including a device that supports streaming and normalization for asymmetric numeral system-based probabilistic shaping in accordance with one or more aspects of the present disclosure.

FIG. 14 shows a diagram of a system 1400 including a device 1405 that supports streaming and normalization for asymmetric numeral system-based probabilistic shaping in accordance with one or more aspects of the present disclosure. The device 1405 may be an example of or include components of a device 1105, a device 1205, or a second wireless device as described herein. The device 1405 may include components for bi-directional voice and data communications including components for transmitting and receiving communications, such as a communications manager 1420, a transceiver 1410, one or more antennas 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., communication link(s) 125, backhaul communication link(s) 120, a midhaul communication link 162, a fronthaul communication link 168).

The at least one memory 1425 may include RAM, ROM, or any combination thereof. The at least one memory 1425 may store computer-readable, computer-executable, or processor-executable code, such as the code 1430. The code 1430 may include instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may include, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting streaming and normalization for asymmetric numeral system-based probabilistic shaping). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425).

In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with one or more other network entities 105, and may include a controller or scheduler for controlling communications with UEs 115 (e.g., in cooperation with the one or more other network devices). In some examples, the communications manager 1420 may support an X2 interface within an LTE/LTE-A wireless communications network technology to provide communication between network entities 105.

The communications manager 1420 may support wireless communications in accordance with examples as disclosed herein. For example, the communications manager 1420 is capable of, configured to, or operable to support a means for obtaining a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol. The communications manager 1420 is capable of, configured to, or operable to support a means for outputting a deshaped information vector based on the set of multiple shaped modulation symbols.

By including or configuring the communications manager 1420 in accordance with examples as described herein, the device 1405 may support techniques for reduced latency and improved user experience related to reduced processing.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of streaming and normalization for asymmetric numeral system-based probabilistic shaping as described herein, or the at least one processor 1435 and the at least one memory 1425 may be otherwise configured to, individually or collectively, perform or support such operations.

Figure 15:
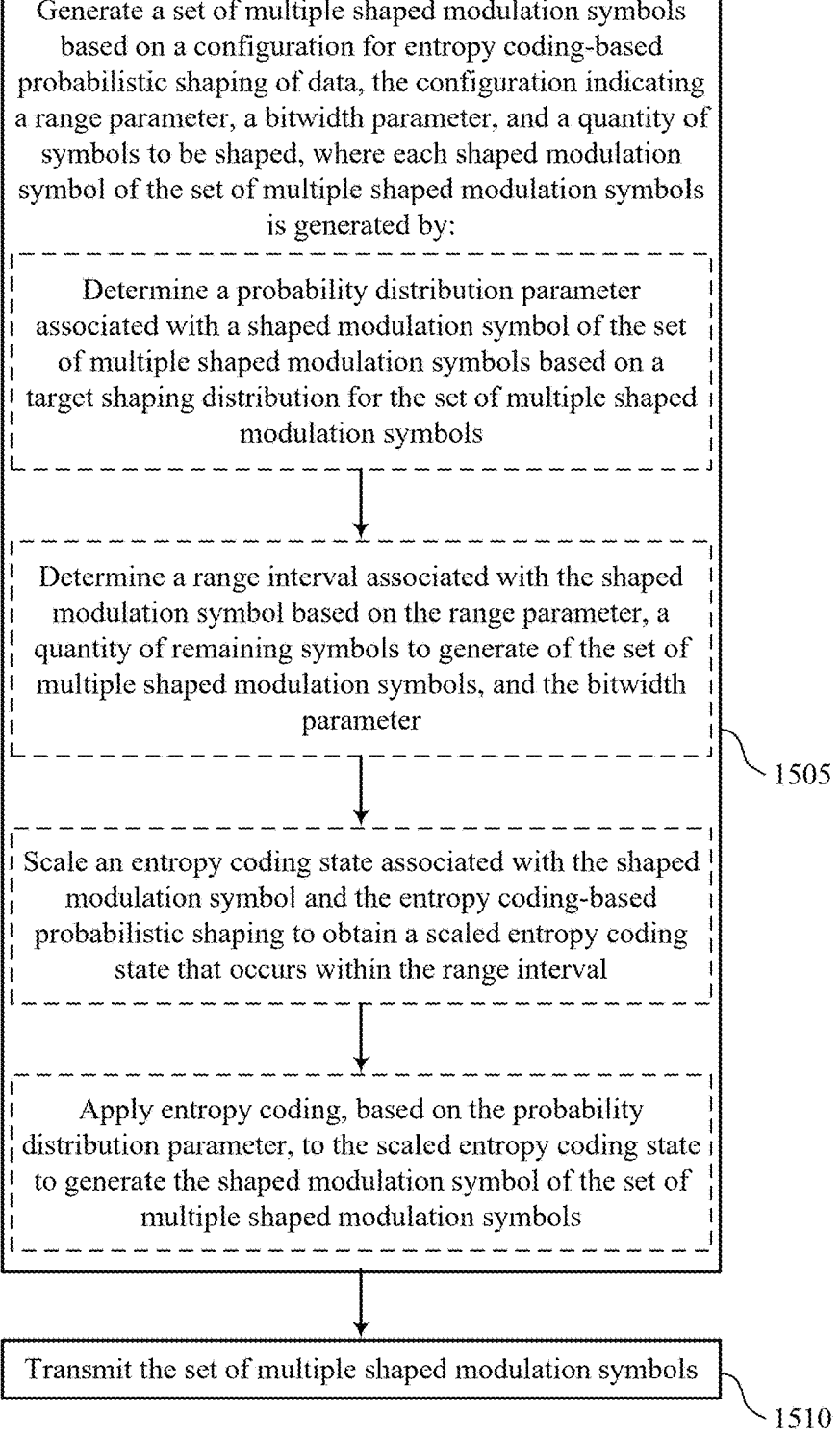

FIG. 15 shows a flowchart illustrating a method 1500 that supports streaming and normalization for asymmetric numeral system-based probabilistic shaping in accordance with one or more aspects of the present disclosure. The operations of the method 1500 may be implemented by a first wireless device or its components as described herein. For example, the operations of the method 1500 may be performed by a first wireless device as described with reference to FIGS. 1 through 10. In some examples, a first wireless device may execute a set of instructions to control the functional elements of the first wireless device to perform the described functions. Additionally, or alternatively, the first wireless device may perform aspects of the described functions using special-purpose hardware.

At 1505, the method may include generating a set of multiple shaped modulation symbols based on a configuration for entropy coding-based probabilistic shaping of data, the configuration indicating a range parameter, a bitwidth parameter, and a quantity of symbols to be shaped, where each shaped modulation symbol of the set of multiple shaped modulation symbols is generated by: determining a probability distribution parameter associated with a shaped modulation symbol of the set of multiple shaped modulation symbols based on a target shaping distribution for the set of multiple shaped modulation symbols, determining a range interval associated with the shaped modulation symbol based on the range parameter, a quantity of remaining symbols to generate of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based on the probability distribution parameter, to the scaled entropy coding state to generate the shaped modulation symbol of the set of multiple shaped modulation symbols. The operations of 1505 may be performed in accordance with examples as disclosed herein. In some examples, aspects of the operations of 1505 may be performed by a symbol generation component 925 as described with reference to FIG. 9.

At 1510, the method may include transmitting the set of multiple shaped modulation symbols. The operations of 1510 may be performed in accordance with examples as disclosed herein. In some examples, aspects of the operations of 1510 may be performed by a symbol transmission component 930 as described with reference to FIG. 9.

FIG. 16 shows a flowchart illustrating a method 1600 that supports streaming and normalization for asymmetric numeral system-based probabilistic shaping in accordance with one or more aspects of the present disclosure. The operations of the method 1600 may be implemented by a second wireless device or its components as described herein. For example, the operations of the method 1600 may be performed by a second wireless device as described with reference to FIGS. 1 through 6 and 11 through 14. In some examples, a second wireless device may execute a set of instructions to control the functional elements of the second wireless device to perform the described functions. Additionally, or alternatively, the second wireless device may perform aspects of the described functions using special-purpose hardware.

At 1605, the method may include obtaining a set of multiple shaped modulation symbols and a configuration for entropy coding-based probabilistic shaping of data, the configuration indicating a range parameter, a bitwidth parameter, and a quantity of symbols to be shaped, where each shaped modulation symbol of the set of multiple shaped modulation symbols is obtained by: determining a probability distribution parameter associated with a shaped modulation symbol of the set of multiple shaped modulation symbols based on a subset of the set of multiple shaped modulation symbols, determining a range interval associated with the shaped modulation symbol based on the range parameter, a frequency associated with the subset of the set of multiple shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based on the probability distribution parameter and the scaled entropy coding state, to update an entropy coding state associated with a second shaped modulation symbol. The operations of 1605 may be performed in accordance with examples as disclosed herein. In some examples, aspects of the operations of 1605 may be performed by a modulation symbol manager 1325 as described with reference to FIG. 13.

At 1610, the method may include outputting a deshaped information vector based on the set of multiple shaped modulation symbols. The operations of 1610 may be performed in accordance with examples as disclosed herein. In some examples, aspects of the operations of 1610 may be performed by an information vector manager 1330 as described with reference to FIG. 13.

The following provides an overview of aspects of the present disclosure:

Aspect 1: A method for wireless communications at a first wireless device, the method comprising: generating a plurality of shaped modulation symbols based at least in part on a configuration for entropy coding-based probabilistic shaping of data, the configuration indicating a range parameter, a bitwidth parameter, and a quantity of symbols to be shaped, wherein each shaped modulation symbol of the plurality of shaped modulation symbols is generated by: determining a probability distribution parameter associated with a shaped modulation symbol of the plurality of shaped modulation symbols based at least in part on a target shaping distribution for the plurality of shaped modulation symbols; determining a range interval associated with the shaped modulation symbol based at least in part on the range parameter, a quantity of remaining symbols to generate of the plurality of shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based at least in part on the probability distribution parameter, to the scaled entropy coding state to generate the shaped modulation symbol of the plurality of shaped modulation symbols, and transmitting the plurality of shaped modulation symbols.

Aspect 2: The method of aspect 1, further comprising: communicating a control message indicating the configuration for the entropy coding-based probabilistic shaping of data.

Aspect 3: The method of any of aspects 1 through 2, wherein the range parameter, the bitwidth parameter, a quantity of bits for initializing the entropy coding state, or any combination thereof, are determined based at least in part on a QAM order, a quantity of shaped symbols per shaping block, a shaping distribution, or any combination thereof.

Aspect 4: The method of aspect 3, wherein the quantity of bits for initializing the entropy coding state is an integer quantity associated with an upper limit; and the bitwidth parameter is divisible by the integer quantity of bits.

Aspect 5: The method of any of aspects 3 through 4, wherein the range parameter is a power of 2.

Aspect 6: The method of any of aspects 1 through 5, wherein determining the probability distribution parameter further comprises: determining the probability distribution parameter based at least in part on the quantity of remaining symbols, a frequency associated with remaining symbols to be generated of the quantity of remaining symbols, and a cumulative function.

Aspect 7: The method of any of aspects 1 through 6, wherein the probability distribution parameter is based at least in part on one or more previously generated shaped modulation symbols of the plurality of shaped modulation symbols.

Aspect 8: The method of any of aspects 1 through 7, wherein a lower boundary of the range interval is based at least in part on a quantity of remaining symbols to be generated of the plurality of shaped modulation symbols and the range parameter.

Aspect 9: The method of any of aspects 1 through 8, wherein the entropy coding state is scaled to occur within the range interval.

Aspect 10: The method of any of aspects 1 through 9, wherein scaling the entropy coding state further comprises: reading a quantity of bits from a bit buffer that stores bits associated with the entropy coding state, the quantity of bits based at least in part on the bitwidth parameter; removing the quantity of bits from the bit buffer after reading the quantity of bits from the bit buffer; and updating, after removing the quantity of bits from the bit buffer, the entropy coding state based at least in part on the quantity of bits read from the bit buffer.

Aspect 11: The method of aspect 10, wherein updating the entropy coding state further comprises: converting a binary value obtained from the quantity of bits read from the bit buffer to a decimal value; scaling the entropy coding state in accordance with the bitwidth parameter; and adding the decimal value to the scaled entropy coding state, wherein the updated entropy coding state is based at least in part on a summation of the decimal value and the scaled entropy coding state.

Aspect 12: The method of any of aspects 10 through 11, wherein the removed quantity of bits occupy an end set of bits of the bit buffer.

Aspect 13: The method of any of aspects 1 through 12, wherein the entropy coding-based probabilistic shaping of data comprises ANS entropy coding.

Aspect 14: A method for wireless communications at a second wireless device, comprising: obtaining a plurality of shaped modulation symbols and a configuration for entropy coding-based probabilistic shaping of data, the configuration indicating a range parameter, a bitwidth parameter, and a quantity of symbols to be shaped, wherein each shaped modulation symbol of the plurality of shaped modulation symbols is obtained by: determining a probability distribution parameter associated with a shaped modulation symbol of the plurality of shaped modulation symbols based at least in part on a subset of the plurality of shaped modulation symbols; determining a range interval associated with the shaped modulation symbol based at least in part on the range parameter, a frequency associated with the subset of the plurality of shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based at least in part on the probability distribution parameter and the scaled entropy coding state, to update an entropy coding state associated with a second shaped modulation symbol, and outputting a deshaped information vector based at least in part on the plurality of shaped modulation symbols.

Aspect 15: The method of aspect 14, further comprising: communicating a control message indicating the configuration for the entropy coding-based probabilistic shaping of data.

Aspect 16: The method of any of aspects 14 through 15, wherein the range parameter, the bitwidth parameter, a quantity of bits for initializing the entropy coding state, or any combination thereof, are determined based at least in part on a QAM order, a quantity of shaped symbols per shaping block, a shaping distribution, or any combination thereof.

Aspect 17: The method of aspect 16, wherein the quantity of bits for initializing the entropy coding state is an integer quantity associated with an upper limit; and the bitwidth parameter is divisible by the integer quantity of bits.

Aspect 18: The method of any of aspects 16 through 17, wherein the range parameter is a power of 2.

Aspect 19: The method of any of aspects 14 through 18, wherein determining the probability distribution parameter further comprises: determining the probability distribution parameter based at least in part on a quantity of shaped modulation symbols, the frequency associated with the quantity of shaped modulation symbols, and a cumulative function.

Aspect 20: The method of any of aspects 14 through 19, further comprising: reversing an order of the plurality of shaped modulation symbols relative to an initial order of receipt of the plurality of shaped modulation symbols.

Aspect 21: The method of aspect 20, further comprising: adding one or more padding bits to the deshaped information vector until a total quantity of bits of the deshaped information vector corresponds to a quantity of bits for initializing the entropy coding state.

Aspect 22: The method of any of aspects 20 through 21, wherein a bit buffer associated with the second wireless device is initialized as an empty buffer.

Aspect 23: The method of any of aspects 14 through 22, wherein an upper boundary of the range interval is based at least in part on the frequency associated with the subset of the plurality of shaped modulation symbols and the range parameter.

Aspect 24: The method of any of aspects 14 through 23, wherein the entropy coding state is scaled to occur within the range interval.

Aspect 25: The method of any of aspects 14 through 24, wherein scaling the entropy coding state further comprises: generating a quantity of bits based at least in part on converting a decimal value associated with the entropy coding state to a binary value, the quantity of bits based at least in part on the bitwidth parameter; and dividing the entropy coding state in accordance with the bitwidth parameter to obtain an intermediate entropy coding state or the scaled entropy coding state.

Aspect 26: The method of aspect 25, wherein the decimal value associated with the entropy coding state is a remainder of dividing the entropy coding state by a power of 2 scaled by the bitwidth parameter.

Aspect 27: The method of any of aspects 14 through 26, wherein obtaining the deshaped information vector further comprises: determining a binary expansion of a final entropy coding state; and concatenating the binary expansion of the final entropy coding state to a plurality of bits included in a bit buffer associated with the second wireless device to obtain the deshaped information vector.

Aspect 28: The method of any of aspects 14 through 27, wherein the entropy coding-based probabilistic shaping of data comprises ANS entropy coding.

Aspect 29: A first wireless device for wireless communications, comprising one or more memories storing processor-executable code, and one or more processors coupled with the one or more memories and individually or collectively operable to execute the code to cause the first wireless device to perform a method of any of aspects 1 through 13.

Aspect 30: A first wireless device for wireless communications, comprising at least one means for performing a method of any of aspects 1 through 13.

Aspect 31: A non-transitory computer-readable medium storing code for wireless communications, the code comprising instructions executable by one or more processors to perform a method of any of aspects 1 through 13.

Aspect 32: A second wireless device for wireless communications, comprising one or more memories storing processor-executable code, and one or more processors coupled with the one or more memories and individually or collectively operable to execute the code to cause the second wireless device to perform a method of any of aspects 14 through 28.

Aspect 33: A second wireless device for wireless communications, comprising at least one means for performing a method of any of aspects 14 through 28.

Aspect 34: A non-transitory computer-readable medium storing code for wireless communications, the code comprising instructions executable by one or more processors to perform a method of any of aspects 14 through 28.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
   one or more memories storing processor-executable code; and
   one or more processors coupled with the one or more memories and individually or collectively operable to execute the code to cause the first wireless device to:
   generate a plurality of shaped modulation symbols based at least in part on a configuration for entropy coding-based probabilistic shaping of data, the configuration indicating a range parameter, a bitwidth parameter, and a quantity of symbols to be shaped, wherein each shaped modulation symbol of the plurality of shaped modulation symbols is generated by:

US 12,676,782 B2

57 determining a probability distribution parameter associated with a shaped modulation symbol of the plurality of shaped modulation symbols based at least in part on a target shaping distribution for the plurality of shaped modulation symbols;

determining a range interval associated with the shaped modulation symbol based at least in part on the range parameter, a quantity of remaining symbols to generate of the plurality of shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy coding, based at least in part on the probability distribution parameter, to the scaled entropy coding state to generate the shaped modulation symbol of the plurality of shaped modulation symbols, and transmit the plurality of shaped modulation symbols.

2. The first wireless device of claim 1, wherein the one or more processors are individually or collectively further operable to execute the code to cause the first wireless device to:

communicate a control message indicating the configuration for the entropy coding-based probabilistic shaping of data.

3. The first wireless device of claim 1, wherein the range parameter, the bitwidth parameter, a quantity of bits for initializing the entropy coding state, or any combination thereof, are determined based at least in part on a quadrature amplitude modulation (QAM) order, a quantity of shaped symbols per shaping block, a shaping distribution, or any combination thereof.

4. The first wireless device of claim 3, wherein:

the quantity of bits for initializing the entropy coding state is an integer quantity associated with an upper limit; and the bitwidth parameter is divisible by the integer quantity of bits.

5. The first wireless device of claim 3, wherein the range parameter is a power of 2.

6. The first wireless device of claim 1, wherein, to determine the probability distribution parameter, the one or more processors are individually or collectively further operable to execute the code to cause the first wireless device to:

determine the probability distribution parameter based at least in part on the quantity of remaining symbols, a frequency associated with remaining symbols to be generated of the quantity of remaining symbols, and a cumulative function.

7. The first wireless device of claim 1, wherein the probability distribution parameter is based at least in part on one or more previously generated shaped modulation symbols of the plurality of shaped modulation symbols.

8. The first wireless device of claim 1, wherein a lower boundary of the range interval is based at least in part on a quantity of remaining symbols to be generated of the plurality of shaped modulation symbols and the range parameter.

9. The first wireless device of claim 1, wherein the entropy coding state is scaled to occur within the range interval.

10. The first wireless device of claim 1, wherein, to scale the entropy coding state, the one or more processors are individually or collectively further operable to execute the code to cause the first wireless device to:

read a quantity of bits from a bit buffer that stores bits associated with the entropy coding state, the quantity of bits based at least in part on the bitwidth parameter;

remove the quantity of bits from the bit buffer after reading the quantity of bits from the bit buffer; and update, after removing the quantity of bits from the bit buffer, the entropy coding state based at least in part on the quantity of bits read from the bit buffer.

11. The first wireless device of claim 10, wherein, to update the entropy coding state, the one or more processors are individually or collectively further operable to execute the code to cause the first wireless device to:

convert a binary value obtained from the quantity of bits read from the bit buffer to a decimal value;

scale the entropy coding state in accordance with the bitwidth parameter; and add the decimal value to the scaled entropy coding state, wherein the updated entropy coding state is based at least in part on a summation of the decimal value and the scaled entropy coding state.

12. The first wireless device of claim 10, wherein the removed quantity of bits occupy an end set of bits of the bit buffer.

13. The first wireless device of claim 1, wherein the entropy coding-based probabilistic shaping of data comprises asymmetric numerical system (ANS) entropy coding.

14. A second wireless device, comprising:

one or more memories storing processor-executable code; and one or more processors coupled with the one or more memories and individually or collectively operable to execute the code to cause the second wireless device to:

obtain a plurality of shaped modulation symbols and a configuration for entropy coding-based probabilistic shaping of data, the configuration indicating a range parameter, a bitwidth parameter, and a quantity of symbols to be shaped, wherein each shaped modulation symbol of the plurality of shaped modulation symbols is obtained by:

determining a probability distribution parameter associated with a shaped modulation symbol of the plurality of shaped modulation symbols based at least in part on a subset of the plurality of shaped modulation symbols;

determining a range interval associated with the shaped modulation symbol based at least in part on the range parameter, a frequency associated with the subset of the plurality of shaped modulation symbols, and the bitwidth parameter, scaling an entropy coding state associated with the shaped modulation symbol and the entropy coding-based probabilistic shaping to obtain a scaled entropy coding state that occurs within the range interval, and applying entropy decoding, based at least in part on the probability distribution parameter and the scaled entropy coding state, to update an entropy coding state associated with a second shaped modulation symbol, and output a deshaped information vector based at least in part on the plurality of shaped modulation symbols.

15. The second wireless device of claim 14, wherein the one or more processors are individually or collectively further operable to execute the code to cause the second wireless device to:

communicate a control message indicating the configuration for the entropy coding-based probabilistic shaping of data.

16. The second wireless device of claim 14, wherein the range parameter, the bitwidth parameter, a quantity of bits for initializing the entropy coding state, or any combination thereof, are determined based at least in part on a quadrature amplitude modulation (QAM) order, a quantity of shaped symbols per shaping block, a shaping distribution, or any combination thereof.

17. The second wireless device of claim 16, wherein:
the quantity of bits for initializing the entropy coding state is an integer quantity associated with an upper limit; and
the bitwidth parameter is divisible by the integer quantity of bits.

18. The second wireless device of claim 16, wherein the range parameter is a power of 2.

19. The second wireless device of claim 14, wherein, to determine the probability distribution parameter, the one or more processors are individually or collectively further operable to execute the code to cause the second wireless device to:
determine the probability distribution parameter based at least in part on a quantity of shaped modulation symbols, the frequency associated with the quantity of shaped modulation symbols, and a cumulative function.

20. The second wireless device of claim 14, wherein the one or more processors are individually or collectively further operable to execute the code to cause the second wireless device to:
reverse an order of the plurality of shaped modulation symbols relative to an initial order of receipt of the plurality of shaped modulation symbols.

21. The second wireless device of claim 20, wherein the one or more processors are individually or collectively further operable to execute the code to cause the second wireless device to:
add one or more padding bits to the deshaped information vector until a total quantity of bits of the deshaped information vector corresponds to a quantity of bits for initializing the entropy coding state.

22. The second wireless device of claim 14, wherein a bit buffer associated with the second wireless device is initialized as an empty buffer.

23. The second wireless device of claim 14, wherein an upper boundary of the range interval is based at least in part on the frequency associated with the subset of the plurality of shaped modulation symbols and the range parameter.

24. The second wireless device of claim 14, wherein the entropy coding state is scaled to occur within the range interval.

25. The second wireless device of claim 14, wherein, to scale the entropy coding state, the one or more processors are individually or collectively further operable to execute the code to cause the second wireless device to:
generate a quantity of bits based at least in part on converting a decimal value associated with the entropy coding state to a binary value, the quantity of bits based at least in part on the bitwidth parameter; and
divide the entropy coding state in accordance with the bitwidth parameter to obtain an intermediate entropy coding state or the scaled entropy coding state.

26. The second wireless device of claim 25, wherein the decimal value associated with the entropy coding state is a remainder of dividing the entropy coding state by a power of 2 scaled by the bitwidth parameter.

27. The second wireless device of claim 14, wherein, to obtain the deshaped information vector, the one or more processors are individually or collectively further operable to execute the code to cause the second wireless device to:
determine a binary expansion of a final entropy coding state; and
concatenate the binary expansion of the final entropy coding state to a plurality of bits included in a bit buffer associated with the second wireless device to obtain the deshaped information vector.

28. The second wireless device of claim 14, wherein the entropy coding-based probabilistic shaping of data comprises asymmetric numerical system (ANS) entropy coding.

29. A method for wireless communications at a first wireless device, the method comprising:
generating a plurality of shaped modulation symbols based at least in part on a configuration for entropy coding-based probabilistic shaping of data, the configuration indicating a range parameter, a bitwidth parameter, and a quantity of symbols to be shaped, wherein each shaped modulation symbol of the plurality of shaped modulation symbols is generated by:
determining a probability distribution parameter associated with a shaped modulation symbol of the plurality of shaped modulation symbols based at least in part on a target shaping distribution for the plurality of shaped modulation symbols;
determining a range interval associated with the shaped modulation symbol based at least in part on the range parameter, a quantity of remaining symbols to generate of the plurality of shaped modulation symbols, and the bitwidth parameter,
scaling an entropy coding state associated with the shaped modulation symbol and the entropy coding-based probabilistic shaping to obtain a scaled entropy coding state that occurs within the range interval, and
applying entropy coding, based at least in part on the probability distribution parameter, to the scaled entropy coding state to generate the shaped modulation symbol of the plurality of shaped modulation symbols, and
transmitting the plurality of shaped modulation symbols.

30. A method for wireless communications at a second wireless device, comprising:
obtaining a plurality of shaped modulation symbols and a configuration for entropy coding-based probabilistic shaping of data, the configuration indicating a range parameter, a bitwidth parameter, and a quantity of symbols to be shaped, wherein each shaped modulation symbol of the plurality of shaped modulation symbols is obtained by:
determining a probability distribution parameter associated with a shaped modulation symbol of the plurality of shaped modulation symbols based at least in part on a subset of the plurality of shaped modulation symbols;
determining a range interval associated with the shaped modulation symbol based at least in part on the range parameter, a frequency associated with the subset of the plurality of shaped modulation symbols, and the bitwidth parameter,
scaling an entropy coding state associated with the shaped modulation symbol and the entropy coding-based probabilistic shaping to obtain a scaled entropy coding state that occurs within the range interval, and applying entropy decoding, based at least in part on the probability distribution parameter and the scaled 5 entropy coding state, to update an entropy coding state associated with a second shaped modulation symbol, and outputting a deshaped information vector based at least in part on the plurality of shaped modulation symbols. 10

* * * * *